(12) United States Patent
Kang et al.

(10) Patent No.: US 11,285,615 B2
(45) Date of Patent: Mar. 29, 2022

(54) SMART DRILLING MACHINE, SMART DRILLING SYSTEM, AND METHOD OF CONTROLLING SMART DRILLING SYSTEM

(71) Applicants: GeoSystem Inc., Seoul (KR); Buildingpointkorea Inc., Seoul (KR)

(72) Inventors: Dong Hun Kang, Goyang-si (KR); Jong Hyun Oh, Seoul (KR); Ji Eun Kim, Seoul (KR); Chang Wook Joh, Seoul (KR); Young Hoon Koh, Incheon (KR)

(73) Assignees: GeoSystem Inc., Seoul (KR); Buildingpointkorea Inc., Seoul (KR)

( * ) Notice: Subject to any disclaimer, the term of this patent is extended or adjusted under 35 U.S.C. 154(b) by 0 days.

(21) Appl. No.: 17/170,892

(22) Filed: Feb. 9, 2021

(65) Prior Publication Data

US 2021/0379767 A1    Dec. 9, 2021

(30) Foreign Application Priority Data

Jun. 8, 2020  (KR) ......................... 10-2020-0068887

(51) Int. Cl.
*B25J 11/00*   (2006.01)
*G05B 19/18*   (2006.01)

(52) U.S. Cl.
CPC ......... *B25J 11/0055* (2013.01); *G05B 19/182* (2013.01); *G05B 2219/45059* (2013.01)

(58) Field of Classification Search
CPC ............... B25J 11/0055; G05B 19/182; G05B 2219/45059
See application file for complete search history.

(56) References Cited

U.S. PATENT DOCUMENTS

| 2009/0078438 A1* | 3/2009 | Muona | E21D 9/006 |
| | | | 703/22 |
| 2009/0164045 A1* | 6/2009 | Deguire | F41G 3/165 |
| | | | 901/30 |

(Continued)

FOREIGN PATENT DOCUMENTS

| JP | 2010-525193 A | 7/2010 |
| KR | 10-2002-0025455 A | 4/2002 |

(Continued)

OTHER PUBLICATIONS

EngineerSupply; www.engineersupply.com/prisms.aspx; Oct. 29, 2017; see web.archive.org screenshot (Year: 2017).*

*Primary Examiner* — Stephen Holwerda
(74) *Attorney, Agent, or Firm* — Park, Kim & Suh, LLC

(57) ABSTRACT

A smart drilling system includes a terminal configured to map a design space to an actual space and having perforation location information in the design space, a drilling machine including a drill for perforation and configured to perform perforation in the actual space under control of the terminal based on the perforation location information, and a total station configured to acquire location information of a reference point in the actual space for mapping the design space to the actual space and location information of the drilling machine in the actual space, and to transmit the location information of the reference point in the actual space and the location information of the drilling machine to the terminal, wherein the terminal recognizes and displays a perforable region or a perforable point at a current position of the drilling machine.

19 Claims, 11 Drawing Sheets

(56) References Cited

U.S. PATENT DOCUMENTS

| | | | | |
|---|---|---|---|---|
| 2010/0126769 A1* | 5/2010 | Haverinen | .............. | E21D 9/006 175/24 |
| 2012/0103598 A1* | 5/2012 | Nadeau | ................... | E21B 44/00 166/245 |
| 2014/0110139 A1* | 4/2014 | Pursimo | ................. | E21B 7/025 173/1 |
| 2016/0121486 A1* | 5/2016 | Lipinski | ................ | B05B 13/005 427/427.3 |
| 2017/0343346 A1* | 11/2017 | Sammoura | ............... | G01C 9/20 |
| 2018/0080322 A1* | 3/2018 | Furge | ...................... | E21F 17/02 |

FOREIGN PATENT DOCUMENTS

| | | |
|---|---|---|
| KR | 10-2007-0122271 A | 12/2007 |
| KR | 10-1184231 B1 | 9/2012 |
| KR | 10-2013-0133284 A | 12/2013 |

* cited by examiner

SMART DRILLING MACHINE, SMART DRILLING SYSTEM, AND METHOD OF CONTROLLING SMART DRILLING SYSTEM

CROSS-REFERENCE TO RELATED APPLICATIONS

This application claims the benefit of Korean Patent Application No. 10-2020-0068887, filed on Jun. 8, 2020, which is hereby incorporated by reference as if fully set forth herein.

BACKGROUND OF THE INVENTION

Field of the Invention

The present disclosure relates to an automatic drilling robot and an automatic drilling robot system and method, and more particularly to an automatic drilling robot and an automatic drilling robot system and method for automatically performing perforation at an accurate position by mapping design coordinates and actual coordinates based on a total station.

Discussion of the Related Art

In general, many perforation points are formed in the ceiling of a building. It is necessary to support various ceiling structures such as water plumbing, piping for water for fire-fighting, or air conditioning equipment including sprinklers and air conditioners. The ceiling structure is supported to the ceiling by an anchor bolt, and accordingly it is required to perforate the ceiling in order to install the anchor bolt.

Needless to say, the number and positions of perforation points on a ceiling surface may differ depending on the use of a building. As the number of perforation points increases, it obviously becomes difficult to perforate the ceiling and the time taken to make holes in the ceiling is inevitably lengthened.

In general, in the case of a small building, a worker manually perforates a ceiling surface using a drill. In this case, the worker is greatly inconvenienced by the requirement to frequently move a ladder or a support depending on the position of a perforation point. Needless to say, it is very difficult to manually perforate the ceiling due to the uncomfortable working posture.

In the case of a relatively large building, the area over which perforation needs to be performed increases, and accordingly the number of perforation points also increases. When a ceiling height is high, the scaffolding is used, and a significant amount of time is taken to ascend and descend the scaffolding and to directly perform perforation work. This is because the scaffolding needs to be moved in order to perform the perforation work at a specific position and then to perform the perforation work at another position, and in this case, the scaffolding needs to be moved after descending for safety. In addition, the scaffolding needs to be raised back to the working height again after being moved. Accordingly, it is very disadvantageous in terms of efficiency to manually perform large amounts of perforation work, in particular, in an environment in which a ceiling height is high.

When large amounts of perforation work are performed, accuracy as well as efficiency is very important. In other words, perforation needs to be accurately performed at a designed position. Here, assuming that the ceiling surface for perforation is a plane, a perforation point needs to be formed at an accurate position on planar coordinates. If not, this is because a lot of difficulties inevitably arise in the work of forming the ceiling structure.

When a worker directly performs perforation using a drill, he or she also manually marks a perforation location. That is, it is common to perform perforation using a drill after marking each perforation location one by one with reference to a blueprint.

Accordingly, it is not easy to mark the perforation location and the accuracy thereof is also inevitably degraded. As a result, the accuracy of perforation is degraded, and the possibility that perforation points are not formed at intended locations after terminating the perforation work inevitably increases. When it is observed that the perforation points are not formed at intended locations, the perforation work needs to be performed again, and accordingly working efficiency is greatly lowered.

As well as in perforation work for a ceiling, this problem also occurs in perforation work for other surfaces such as vertical walls.

SUMMARY OF THE INVENTION

An object of the present disclosure is to provide a drilling machine, a drilling system, and a method of controlling the drilling system for more accurately, rapidly, and safely performing perforation work.

An embodiment of the present disclosure may provide a drilling machine, a drilling system, and a method of controlling the drilling system for collectively setting a plurality of perforation points and also setting a specific single perforation point as necessary.

An embodiment of the present disclosure may provide a drilling machine, a drilling system, and a method of controlling the drilling system for automatically perforating a plurality of perforation points and also automatically perforating a specific single perforation point as necessary. As such, an embodiment of the present disclosure may provide a drilling machine, a drilling system, and a method of controlling the drilling system for flexibly responding to the situation in the field.

An embodiment of the present disclosure may provide a drilling machine, a drilling system, and a method of controlling the drilling system for flexibly applying design information for a perforation point provided in various forms. As such, an embodiment of the present disclosure may provide a drilling machine, a drilling system, and a method of controlling the drilling system which are easily used even if the situation in the field or a design form is changed.

An embodiment of the present disclosure may provide a drilling machine, a drilling system, and a method of controlling the drilling system for easily connecting a drilling machine and a total station through a personal computer (PC) (terminal) for controlling the drilling machine and the total station and simultaneously easily recognizing state information of the drilling machine and the total station.

An embodiment of the present disclosure may provide a drilling machine, a drilling system, and a method of controlling the drilling system for reducing the time taken to perforate all perforation points by minimizing movement of the drilling machine when all of the perforation points are perforated.

An embodiment of the present disclosure may provide a drilling machine, a drilling system, and a method of controlling the drilling system for recognizing an optimum moving route for moving a drilling machine by recognizing a perforable point at the current position of the drilling machine and displaying the perforable point on a PC (terminal).

An embodiment of the present disclosure may provide a drilling machine, a drilling system, and a method of controlling the drilling system for allowing a worker to intuitively recognize the current state of perforation work by mutually distinguishably displaying all of the perforation point, the perforable point, the perforated point, and the point being perforated.

An embodiment of the present disclosure may provide a drilling machine, a drilling system, and a method of controlling the drilling system for reducing the time taken to recognize the perforable point by setting any one of three reference points for recognizing a work region of the drilling machine as a reference position point of the drilling machine.

An embodiment of the present disclosure may provide a drilling machine, a drilling system, and a method of controlling the drilling system for reducing a time taken to perform perforation by minimizing a moving route of a position adjustment device of a drilling machine between perforation tasks when perforation is continuously performed.

An embodiment of the present disclosure may provide a drilling machine, a drilling system, and a method of controlling the drilling system for performing perforation to an accurate depth at an accurate position despite an error due to the state of a floor surface on which the drilling machine is positioned, a construction error due to the state of a ceiling surface on which perforation is performed, or vibration.

An embodiment of the present disclosure may provide a drilling machine, a drilling system, and a method of controlling the drilling system for minimizing a change in the control logic of the drilling machine and the total station by acquiring state information of the drilling machine via real-time communication with the drilling machine and controlling the operation of the drill and the position adjustment device of the drilling machine using a PC (terminal), and acquiring the location information of the drilling machine via real-time communication with the total station by the PC (terminal).

According to an aspect of the present disclosure, a smart drilling system includes a terminal (PC) configured to map a design space to an actual space and having perforation location information in the design space, a drilling machine including a drill for perforation and configured to perform perforation in the actual space under control of the terminal based on the perforation location information, and a total station configured to acquire location information of a reference point in the actual space for mapping the design space to the actual space and location information of the drilling machine in the actual space, and to transmit the location information of the reference point in the actual space and the location information of the drilling machine to the terminal.

Here, the terminal may be a tablet PC, a desk top PC, or a laptop PC. However, it is necessary to be able to easily carry and manipulate the terminal in a jobsite, and thus the terminal may be a tablet PC. However, the shape, type, and size of a PC may be easily changed and modified.

The terminal may include a display region. A view containing perforation location information, location information of the total station, and location information of the drilling machine, obtained through mapping information between the design space and the actual space, may be displayed in the display region.

The view containing the perforation location information, the location information of the total station, and the location information of the drilling machine may be displayed after the terminal recognizes the total station and the drilling machine. The perforation location information, the location information of the total station, and the location information of the drilling machine may be sequentially added and may be displayed together.

First, the view having the perforation location information may be displayed and then a view to which location information of the total station is added may be displayed in this view. Then, a view to which location information of the drilling machine is added may be displayed in this view.

Accordingly, a worker may intuitively perform perforation preparation work using a view that is sequentially changed for perforation work.

The display region may include a submenu for zooming in/out, rotation, and viewpoint conversion of the view. A field drawing designed three-dimensionally may be easily recognized through conversion between various viewpoints such as a plane view.

The terminal may include a menu region. The menu region may be separated from the display region in terms of a position in the display of a PC. The menu region may be positioned above the display, and the display region may be positioned below the menu region. The greatest portion of the display may be occupied by the display region.

The menu region may include a menu for connection between the terminal and the total station via communication and a menu for connection between the terminal and the drilling machine via communication.

Menus in the menu region may be arranged in consideration of the order of the perforation work. Thus, menus for connection between components for preparing perforation may be disposed at the leftmost side of the display. Menus corresponding to subsequent tasks may be sequentially arranged on the right side.

The menu region may include a work menu for separating a plurality of actual spaces in which perforation work is to be performed.

A series of perforation tasks that require a long time may be divided into a plurality of units, and may be easily managed. The series of perforation tasks may be divided and may be named for each floor or space in a building. For example, a first floor is divided into sector A, section B, and sector C of the first floor, which may have respective task names assigned thereto. The task manes may be set through a new task menu, and when one task is not completed, an existing task may be imported again through a task open menu.

The menu region may include a drawing open menu for inputting a drawing containing perforation location information in a design space and displaying the input drawing in the display region.

A blueprint matching with the aforementioned task name may be imported through the drawing open menu.

The format of the blueprint may vary depending on a designer. Perforation points may also be displayed in one 3D drawing and may also be displayed as 2D drawings with respect to one 3D drawing. The perforation point may be displayed with a red-filled circle or may be displayed with an empty circle.

Accordingly, it may be necessary to import a drawing through a drawing open menu and then to extract a perforation point from the displayed drawing.

The terminal may include a perforation coordinate display region separately from the menu region and the display region.

When perforation points are extracted from the displayed drawing, coordinates of the extracted perforation points may be mutually distinguishably displayed in the perforation coordinate display region.

In detail, perforation points may be visibly displayed in the display region, but the perforation point may be displayed in perforation coordinates, that is, numbers in the perforation coordinate display region. In addition, a perforation point name for separating the perforation points may be displayed. State information of each perforation point may also be displayed. That is, coordinates of the perforation point and the state of the perforation point may be displayed together in the perforation coordinate display region.

The perforation coordinate display region may include a submenu for adding coordinates of the perforation point.

The submenu may include at least one of a drawing menu for adding coordinates of the perforation point to a drawing, a file menu for adding coordinates of the perforation point in a spreadsheet file, and a coordinate menu for writing and adding coordinates of the perforation point by a user.

The menu region may include a reference-point setting menu for acquiring location information of a reference point in the actual space and displaying the position of the total station in the display region by the total station.

The reference point of the actual space may be three reference points having different coordinates. The actual coordinates of the three reference points need to be known. The actual space and the design space may be mapped to each other using the known actual coordinates. A PC may calculate a transform matrix for mapping the design space to the actual space, and the two spaces may be mapped to each other using the transform matrix.

When the position of the total station is displayed in the display region and then location information of the drilling machine is acquired by collimating the drilling machine by the total station, the position of the drilling machine may be displayed.

A space shown in the display region and an actual space may be mapped to each other. That is, a 3D actual space may be displayed in a mapped 3D space in the display region. In other words, the actual space may be embodied on a display. As described above, a viewpoint of a view on the display may be changed in various ways.

After acquiring location information of the drilling machine, the drilling machine may be operated to acquire location information of three different work regions of the drilling machine from the total station.

The drilling machine needs to be moved to perform perforation with respect to an entire actual space. This is because the region in which perforation is capable of being performed using a position adjustment device is limited in the state in which the drilling machine is fixed.

Accordingly, a reference point for setting a reference portion of the drilling machine needs to be configured. Similarly, it may be necessary to recognize a region in which the drilling machine is capable of performing perforation at the current position of the drilling machine. To this end, location information of three work regions of the drilling machine may be required.

Here, any one of the location information of three work regions of the drilling machine may be a reference point of the drilling machine.

In detail, when location information of the drilling machine is acquired, the position of the drilling machine in the design space may be recognized. However, it may not be possible to recognize an accurate orientation or shape of the drilling machine. Thus, it may be necessary to convert the coordinate system of the drilling machine into the coordinate system of a design space. In other words, the precise orientation of the drilling machine may be checked by recognizing the location information of three work regions of the drilling machine, and thus a perforable point may be recognized at the current position.

Displacement in which the drill is moveable along three axes in 3D to perform perforation at the current position of the drilling machine may be preset according to the specifications of the drilling machine. The specifications may be known by a controller of the drilling machine or a PC.

Thus, when location information of three work regions of the drilling machine is recognized, an actual space and a work region of the drilling machine may be mapped to each other. That is, the orientation of the drilling machine may be recognized by converting a coordinate system of the drilling machine into a coordinate system of a design space, and thus a perforable point may be recognized at the current position. This means that it is possible to map a space displayed on a PC and a work region of the drilling machine to each other. Here, the work region of the drilling machine may be referred to as a work region of the drilling machine. However, in many cases, the drilling machine performs perforation in the same plane as a ceiling surface, and thus the work region of the drilling machine may be referred to a drilling machine work region for convenience.

The menu region may include a perforable point verification menu for recognizing a perforable point at the current position of the drilling machine based on the location information of three work regions of the drilling machine.

When the perforable point verification menu is selected, the drilling machine may be sequentially moved to the three work region positions in the PC. In detail, the position adjustment device for adjusting the position of the drill may be operated to move the drill to three reference positions.

The total station may acquire location information of the three reference positions, and may transfer the acquired location information to a PC. Thereby, the PC may convert a coordinate system of a drilling machine into a coordinate system of a design space to accurately recognize the orientation of the drilling machine and may recognize a perforable point at the current position of the drilling machine with respect to all perforation points.

When the perforable point verification menu is selected, the display region may mutually distinguishably display a perforable point and the remaining perforation points among the all perforation points. Thus, a worker may visibly and intuitively recognize the progress of perforation work through the display.

The menu region may include a perforation menu for selecting the perforable points to be sequentially perforated. When the perforation menu is selected, a plurality of perforable points may be sequentially and collectively perforated. Accordingly, input of a command for perforation by a worker may be minimized.

When the perforation menu is selected, as perforation proceeds, a perforable point, a point being perforated, and a perforated point may be mutually distinguishably displayed. Thus, the worker may visibly and intuitively recognize a progress of perforation.

The perforation coordinate display region may include a selected point perforation menu for selecting one specific perforation point among the perforate points to be perforated. The selected point perforation menu may be configured to perforate a specific perforation point in a specific situation. When perforation points are not collectively added, but instead one specific perforation point is added, perforation may be flexibly performed through the selected point perforation menu. Thus, the drilling machine may be flexibly used depending on the situation in the field in two perforation modes, including a mode in which a plurality of perforation points is perforated and a mode in which a single perforation point is perforated.

The specific perforation point may be selected by clicking a specific perforation point in the display region or clicking a specific perforation point displayed in the perforation coordinate display region.

To achieve the aforementioned object, an embodiment of the present disclosure may provide a smart drilling machine for performing perforation through control of driving of an external terminal, the smart drilling machine including a drill, a position adjustment device configured to three-dimensionally move the drill, a prism configured to allow an external total station to acquire the location information of the smart drilling machine through tracking by the external total station, a moving device configured to support the drilling machine on the floor surface of the actual space and to move the position adjustment device parallel to the floor surface of the actual space, and an ascending/descending device disposed between the moving device and the position adjustment device and configured to adjust the height of an initial position of the drill, wherein the smart drilling machine is configured to execute a single perforation mode and a multiple perforation mode through control of the terminal.

In the single perforation mode, the position adjustment device may drive the drill so as to sequentially move the same to a home position, a margin position for a perforation point, a perforation location, and a home position.

In the multiple perforation mode, the position adjustment device may drive the drill to perforate a specific perforation point and may then drive the drill to a margin position from the perforation location before perforation at a next perforation point.

In the multiple perforation mode, a driving pattern of the position adjustment device for perforating a first perforation point and a driving pattern of the position adjustment device after a last perforation point is perforated may be the same as in the single perforation mode. However, the driving pattern of the position adjustment device when intermediate perforation points are perforated may differ therefrom. That is, in this case, the drill may not return to the home position. Thereby, the time taken to perform perforation while a plurality of perforation tasks is performed may be greatly reduced.

Here, the home position of the drill may be a home position of the drilling machine or a home position of the position adjustment device. The lowest and most stable posture of the position adjustment device may be taken as the home position or a reference position of the drilling machine.

The margin position may be a position spaced apart downwards from a designed position of a perforation point by a preset distance in consideration of a construction error. The margin position may be a position spaced apart downwards from a designed start point of perforation by about 5 to 10 cm.

A ceiling surface on which perforation is performed may be actually constructed higher or lower than the intended height. In this case, accurate perforation is not likely to be performed to the intended perforation depth.

The position adjustment device may include a sensor configured to move the drill until the drill comes into contact with the ceiling surface at the margin position and to recognize the position at which the drill comes into contact with the ceiling surface. That is, when the position at which the drill comes into contact with the ceiling surface is recognized, perforation may be performed to a designed perforation depth from this position. Thus, even if a construction error occurs, accurate perforation may be performed according to the designed perforation depth.

To achieve the aforementioned object, an embodiment of the present disclosure may provide a method of controlling a smart drilling system, the method including a setting operation of connecting a total station and a drilling machine via communication and displaying perforation location information in a design space, by a terminal, a first measurement operation of acquiring location information of a reference point of the actual space and transmitting the acquired location information to the terminal, by the total station, a first matching operation of displaying a location of the total station, by the terminal, a second measurement operation of acquiring location information of the drilling machine and transmitting the acquired location information to the terminal, by the total station, a second matching operation of displaying a location of the drilling machine, by the terminal, a third measurement operation of operating the drilling machine to occupy positions of three work regions of the drilling machine, sequentially acquiring location information of the three work regions of the drilling machine, and transmitting the acquired location information to the terminal, by the total station, a perforation preparation operation of displaying a perforable region or a perforable point at a current position of the drilling machine, by the terminal, and a perforation operation of performing perforation through a drill of the drilling machine.

The method of controlling the smart drilling system may include a third measurement operation of operating the drilling machine to occupy positions of three work regions of the drilling machine, acquiring location information of the three work regions of the drilling machine, and transmitting the acquired location information to the terminal, by the total station. The third measurement operation may be performed after the second matching operation is performed.

The method of controlling the smart drilling system may include a perforation preparation operation of displaying a perforable region or a perforable point at the current position of the drilling machine. The perforation preparation operation may be performed after the third measurement operation is performed.

The perforation operation may include mutually distinguishably displaying all perforation points, a current perforable point, a perforated point, and a point being perforated, by the terminal.

In a single perforation mode, the terminal may control the position adjustment device to sequentially move the drill to a home position, a margin position of the perforation point, the perforation location, and the home position.

In a multiple perforation mode, the terminal may control the position adjustment device to move the drill to a margin position before perforation of a subsequent perforation point from a perforation location after perforation of a specific perforation point.

The setting operation may include an operation of inputting a drawing containing perforation location information in a design space and displaying the input drawing in the display region.

The setting operation may include an operation of extracting a perforation point from the displayed drawing and displaying coordinates of the extracted perforation point.

The setting operation may include an operation of adding a perforation point through any one of an additional drawing, a spreadsheet file, and coordinate description in the display drawing.

To achieve the above objective, according to an embodiment of the present disclosure, a smart drilling system includes a terminal (PC) configured to map a design space to an actual space and having perforation location information in the design space, a drilling machine (a smart drilling machine and a smart drilling robot) including a drill for perforation and configured to perform perforation in the actual space under control of the terminal based on the perforation location information, and a total station configured to acquire location information of a reference point in the actual space for mapping the design space to the actual space and location information of the drilling machine in the actual space, and to transmit the location information of the reference point in the actual space and the location information of the drilling machine to the terminal, wherein the terminal recognizes and displays a perforable region or a perforable point at the current position of the drilling machine through the location information of the drilling machine.

The drilling machine may include a position adjustment device configured to three-dimensionally move the drill for perforation, and a prism configured to allow the total station to acquire the location information of the drilling machine.

The position adjustment device may include the prism. A home position of the position adjustment device, that is, a preset stable position of the prism, may be referred to as a home position of the drilling machine.

As the position adjustment device is driven, the position of the prism may be changed. Thus, a reference position of the drilling machine may also be changed.

When the entire drilling machine is moved, it may be required to move the drilling machine in a stable posture. That is, accidents may be prevented by moving the drilling machine in the state in which the center of gravity thereof is lowered. Accordingly, the drilling machine may be moved to the home position of the position adjustment device, that is, the home position of the drilling machine. In other words, when perforation by the drilling machine at the current position is completed, the position adjustment device may return to the home position, and then the drilling machine may be moved.

The relative position of the prism with respect to the drill may be fixed, and a three-dimensional displacement and an angle of the drill may be the same with a three-dimensional displacement and an angle of the the prism when the position adjustment device is driven. That is, the drill and the prism may be moved as one body.

The drilling machine may include a moving device configured to support the drilling machine with respect to the floor surface of the actual space and to move the position adjustment device parallel to the floor surface of the actual space.

The moving device may include a wheel or a caterpillar track and may be manually or electrically moved. The moving device may include a handle for vertical movement, and may include a manipulation unit for electrical movement. The manipulation unit may be included in the drilling machine separately from the terminal. Needless to say, the moving device may include a separate remote controller for remote control.

The drilling machine may include an ascending/descending device disposed between the moving device and the position adjustment device and configured to adjust a height of an initial position of the drill. The ascending/descending device may be manually or electrically operated. When the ascending/descending device is electrically operated, the ascending/descending device may include a manipulation unit. The manipulation unit may be included in a drilling machine separately from the terminal. Needless to say, the drilling machine may include a separate remote controller for remote control.

The position adjustment device may be a robot including a plurality of arms, and the drill and the prism may be disposed at an arm installed at an end of the robot.

The arm disposed at the end of the robot among a plurality of arms of the robot may have a larger upward-and-downward variable region than other arms. That is, the arm disposed at the end of the robot may be positioned at the uppermost position. Thus, the arm disposed at the end may most accurately indicate the current height of the position adjustment device. The prism may be included in the arm.

The location information of the drilling machine may include reference location information of the drilling machine and location information of three robot work regions based on preset driving of the robot.

As described above, the reference location information of the drilling machine may be home location information of the position adjustment device. Any one of information on the three work regions of the robot may be home location information of the position adjustment device.

Location information may be acquired at a home position, location information may be acquired at a first work region position, and location information may be acquired at a second work region position. Here, the home position, the second work region position, and the third work region position may be preset according to the specifications of the drilling machine or the robot. That is, it may be seen that the prism is moved to these positions by preset driving of the position adjustment device or the robot. Thus, a space of a work region of the drilling machine may be mapped to a design space. Thereby, the regions in which the drilling machine is to work in the actual space may be recognized.

The terminal may control the robot to be moved to locations of the three robot work regions. The total station may sequentially acquire location information of the three robot work regions and may transmit the acquired location information to the terminal.

The location information of the three work regions of the robot may be acquired by a worker through collimation by the total station or prism tracking by the total station.

The terminal may mutually distinguishably display all of the perforation point, the current perforable point, the perforated point, and the point being perforated.

The location information of the drilling machine may be acquired by tracking the total station and the prism in real time. Thus, when the entire drilling machine is moved, the total station may recognize the moving route of the drilling machine in real time and may transmit the same to the terminal. Thus, the terminal may display the drilling machine and the moving route thereof in real time on the display.

The drilling machine may include a tilt sensor for sensing slopes along three axes, and a value sensed by the tilt sensor may be transmitted to the terminal.

The terminal may control driving of the position adjustment device and driving of the drill.

The drilling machine may transmit state information on driving of the position adjustment device and the drill to the terminal.

To achieve the aforementioned object, an embodiment of the present disclosure may provide a smart drilling machine for performing perforation through control of driving of an external terminal, the smart drilling machine including a drill, a position adjustment device configured to three-dimensionally move the drill for perforation, a prism configured to allow an external total station to acquire the location information of the smart drilling machine through tracking by the external total station, a moving device configured to support the drilling machine on the floor surface of the actual space and to move the position adjustment device parallel to the floor surface of the actual space, and an ascending/descending device disposed between the moving device and the position adjustment device and configured to adjust the height of an initial position of the drill, wherein the position adjustment device moves the prism to locations of three work regions of the drilling machine through preset driving to allow the terminal to recognize a perforable region or a perforable point of the drilling machine through the total station.

The smart drilling machine may include a tilt sensor for sensing slopes along three axes, and a value sensed by the tilt sensor may be transmitted to the terminal.

The position adjustment device and the drill may be driven under the control of the terminal, and state information of driving of the position adjustment device and the drill may be transmitted to the terminal.

The position adjustment device may be a robot including a plurality of arms.

The smart drilling machine may include a sensor configured to detect contact with a ceiling surface when the drill moves upwards to prevent an error in an actual perforation depth due to a construction error, and may transmit a value sensed by the sensor to the terminal.

After the drill comes into contact with the ceiling surface, perforation may be performed to a preset perforation depth based on the contact position with the ceiling surface.

To achieve the aforementioned object, an embodiment of the present disclosure may provide a method of controlling a smart drilling system, the method including a setting operation of connecting a total station and a drilling machine via communication and displaying perforation location information in a design space, by a terminal, a first measurement operation of acquiring location information of a reference point of the actual space and transmitting the acquired location information to the terminal, by the total station, a first matching operation of displaying a location of the total station, by the terminal, a second measurement operation of acquiring location information of the drilling machine and transmitting the acquired location information to the terminal, by the total station, a second matching operation of displaying the location of the drilling machine, by the terminal, a third measurement operation of operating the drilling machine to occupy positions of three work regions of the drilling machine, sequentially acquiring location information of the three work regions of the drilling machine, and transmitting the acquired location information to the terminal, by the total station, a perforation preparation operation of displaying a perforable region or a perforable point at a current position of the drilling machine, by the terminal, and a perforation operation of performing perforation using a drill of the drilling machine.

When all perforation tasks are terminated at the current position of the drilling machine, the total station may track the movement of the drilling machine in real time and may transmit the acquired location information of the drilling machine to the terminal.

When the position of the drilling machine is moved, the moving route of the drilling machine may be displayed on the terminal.

In the perforation operation, all perforation points, a current perforable point, a perforated point, and a point being perforated may be mutually distinguishably displayed by the terminal.

The setting operation may include inputting a drawing containing perforation location information in a design space and displaying the input drawing in the display region.

The setting operation may include extracting a perforation point from the displayed drawing and displaying the coordinates of the extracted perforation point.

The method may include, in order to correct an error due to the state of the floor surface on which the drilling machine is positioned, transmitting a sensing value in a three-axis tilt sensor included in the drilling machine to the terminal.

To achieve the aforementioned object, an embodiment of the present disclosure may provide a smart drilling machine including a terminal configured to map a design space to an actual space and having perforation location information in the design space, a drilling machine including a drill for perforation and configured to perform perforation in the actual space under control of the terminal based on the perforation location information, and a total station configured to acquire location information of a reference point in the actual space for mapping the design space to the actual space and location information of the drilling machine in the actual space, and to transmit the location information of the reference point in the actual space and the location information of the drilling machine to the terminal, wherein the terminal recognizes a position of the ceiling surface with which the drill comes into contact through a sensor included in the drilling machine and the terminal controls driving of the drilling machine to move the drill of the drilling machine mutually distinguishably at a home position, a margin position of the perforation point, the contact position of the ceiling surface, and the perforation location.

The margin position may be a position spaced apart downwards from a designed position of a perforation point by a preset distance in consideration of a construction error.

The terminal may control the drill to be driven for perforation after the drill comes into contact with the ceiling surface.

The drilling machine may control the drill to be moved upward from the margin position, and such upward movement may be performed until the drill comes into contact with the ceiling surface. Accordingly, when the drill comes into contact with the ceiling surface, the contact position may be recognized. The drill may not be driven until the drill comes into contact with the ceiling surface.

The terminal may control the drill to perform perforation to a designed depth based on the position at which the drill comes into contact with the ceiling surface. Thus, even if a construction error occurs in the ceiling surface, perforation may be performed to an accurate depth.

The drilling machine may include a tilt sensor configured to sense slopes along three axes and may transmit a value sensed by the tilt sensor to the terminal.

The terminal may correct an error due to the state of the floor surface on which the drilling machine is placed based on the value sensed by the tilt sensor.

The terminal may reduce an error due to vibration of the drilling machine, or may correct the error through the value sensed by the tilt sensor.

When vibration occurs in the drilling machine, an error may randomly occur. Thus, when a slope value, observed by a tilt sensor, is arbitrarily changed, driving of the position adjustment device may be stopped, and after vibration is stopped, the value sensed by the position adjustment device may be driven again. Thus, error due to vibration of the drilling machine may be remarkably reduced.

The terminal may determine the time at which the drill begins to move to a ceiling surface contact position from the margin position or the time at which the drill begins to move to the perforation location from the ceiling surface contact position through a value sensed by the tilt sensor.

The drilling machine may include a prism for allowing the total station to acquire location information of the drilling machine through collimation or tracking by the total station.

The prism and the tilt sensor may be configured as one body, and the prism and the tilt sensor may be integrally moved with the drill. That is, the prism and the tilt sensor may be integrally manufactured.

In a single perforation mode, the terminal may control the drill to be sequentially moved to a home position, a margin position of the perforation point, the perforation location, and the home position.

In a multiple perforation mode, the terminal may control the drill to be moved to a margin position before perforation of a subsequent perforation point from a perforation location after perforation of a specific perforation point. Thus, the time taken to move the drill to the subsequent perforation point after the current perforation point may be remarkably reduced.

In order to recognize a perforable region at the current location of the drilling machine, the terminal may perform control to drive the drilling machine to positions of three work regions of the drilling machine.

The home position of the drill may be one of the positions of three work regions of the drilling machine. The home position of the drill may alternatively be referred to as the home position of the position adjustment device, and may also be referred to as the home position of the drilling machine.

The total station may collimate the drilling machine and may transmit location information of three work regions of the drilling machine to the terminal. According, the terminal may recognize the perforable region and perforable points at the current position of the drilling machine.

The terminal may display a perforable point and may include a menu for selecting a single perforation mode for perforating a single perforation point among perforable points and a multiple perforation mode for sequentially perforating perforable points.

To achieve the aforementioned object, an embodiment of the present disclosure may provide a smart drilling machine for performing perforation through control of driving of an external terminal, the smart drilling machine including a drill, a position adjustment device configured to three-dimensionally move the drill for perforation, a prism configured to allow an external total station to acquire the location information of the smart drilling machine through tracking by the external total station, a sensor configured to detect the position at which the drill comes into contact with a ceiling surface, a moving device configured to support the drilling machine on the floor surface of the actual space and to move the position adjustment device parallel to the floor surface of the actual space, and an ascending/descending device disposed between the moving device and the position adjustment device and configured to adjust a height of an initial position of the drill, wherein the drill is moved to the position at which the drill comes into contact with the ceiling surface from a margin position spaced apart downwards from a designed perforation point in consideration of a construction error, and then perforation is performed to a design depth based on the position at which the drill comes into contact with the ceiling surface.

The position adjustment device may be a robot including a plurality of arms, and the sensor may be a torque sensor disposed at a joint between arms. The torque sensor may be disposed at each of a plurality of joints, and when the torque sensor detects a specific torque value or greater, it may be determined that movement of the arm is confined. Based thereon, the position at which the drill and the ceiling surface contact each other may be recognized.

The smart drilling system may include a tilt sensor configured to sense slopes along three axes and may transmit a value sensed by the tilt sensor to the terminal.

The smart drilling system may include a prism for allowing the total station to acquire location information of the drilling machine through collimation or tracking by the total station.

The prism and the tilt sensor may be configured as one body, and the prism and the tilt sensor may be moved integrally with the drill.

To achieve the aforementioned objective, according to an embodiment of the present disclosure, a method of controlling a smart drilling system includes a setting operation of connecting a total station and a drilling machine via communication and displaying perforation location information in a design space, by a terminal, a first measurement operation of acquiring location information of a reference point of the actual space and transmitting the acquired location information to the terminal, by the total station, a first matching operation of displaying a location of the total station, by the terminal, a second measurement operation of acquiring location information of the drilling machine and transmitting the acquired location information to the terminal, by the total station, a second matching operation of displaying a location of the drilling machine, by the terminal, and a perforation operation of performing perforation through a drill of the drilling machine, wherein the perforation operation includes an operation of controlling driving of the drilling machine mutually distinguishably at a home position, a margin position of the perforation point, a ceiling surface contact position, and a perforation location of the drilling of the drilling machine.

The method of controlling the smart drilling system may include a third measurement operation of operating the drilling machine to occupy positions of three work regions of the drilling machine, sequentially acquiring location information of the three work regions of the drilling machine, and transmitting the acquired location information to the terminal, by the total station.

The third measurement operation may be performed after the second matching operation is performed. Through the third measurement operation, the region in which the drilling machine is capable of performing work at the current position of the drilling machine may be specified.

The method of controlling the smart drilling system may include a perforation preparation operation of displaying a perforable region or a perforable point at the current position of the drilling machine, by the terminal.

The perforation preparation operation may be performed after the third measurement operation is performed. When the region in which the drilling machine is capable of performing work is specified, the region may be matched to perforation points. That is, a perforation point present in a work region may be specified. Thus, the perforable point may be visibly and intuitively recognized through the perforation preparation operation.

In the perforation operation, after the drill comes into contact with the ceiling surface, the drill may be controlled to be driven for perforation.

In the perforation operation, the drill may be controlled to be perforated to a design depth based on the contact position at which the drill and the ceiling surface contact each other.

The drilling machine may include a tilt sensor for sensing slopes along three axes, and an error due to a floor surface on which the drilling machine is positioned may be compensated for through a value sensed by the tilt sensor.

An error due to vibration of the drilling machine may be reduced or corrected through the value sensed by the tilt sensor.

Features according to the aforementioned embodiments may be embodied in combinations according to other embodiments unless they contradict each other or are mutually exclusive with each other.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION OF THE INVENTION

Hereinafter, a smart drilling machine, a smart drilling system, and a method of controlling the smart drilling system will be described with regard to exemplary embodiments of the present disclosure with reference to the attached drawings.

Figure 1:
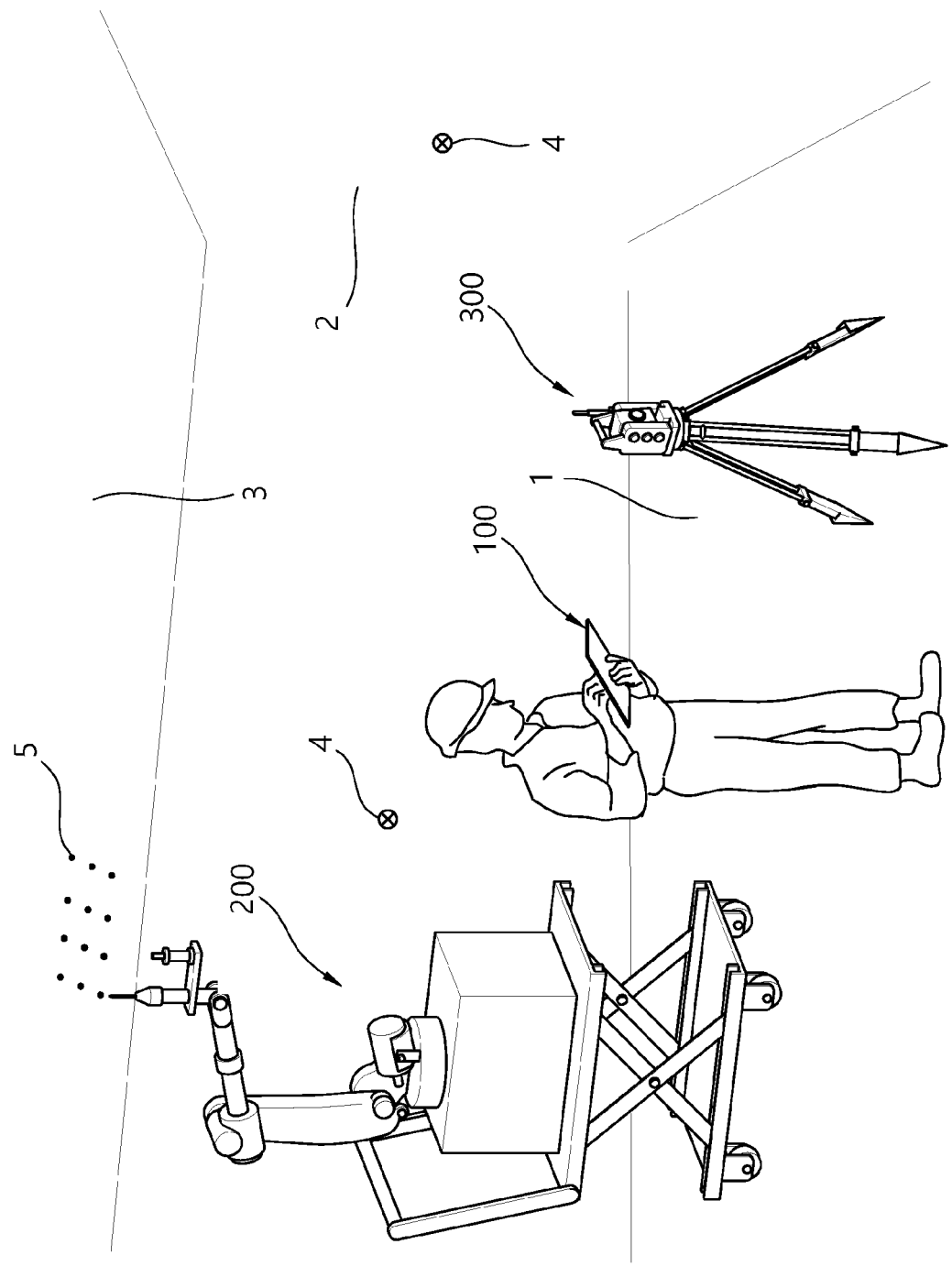
FIG. 1 is a diagram showing a concept of the configuration of a smart drilling system according to an embodiment of the present disclosure.

FIG. 1 is a diagram showing a concept of the configuration of a smart drilling system according to an embodiment of the present disclosure.

The smart drilling system may include a terminal 100, a smart drilling machine 200, and a total station 300.

The smart drilling system may be configured to automatically perform perforation and, for example, may be configured to perforate an indoor ceiling surface.

A perforation point needs to be formed according to a predetermined rule. That is, perforation needs to be performed at a designed position and to a designed size and depth. That is, perforation needs to be performed according to preset perforation conditions.

The preset perforation conditions may be obtained from a blueprint, and accordingly, the perforation conditions may be transferred to a drilling machine, and the drilling machine may automatically perform perforation. To this end, it may be necessary to accurately map a design space to an actual space. Here, the actual space may be, for example, an indoor space of a building in which perforation is directly performed.

In order to map the design space to the actual space, the total station 300 may be included. The total station 300 may be positioned on a floor surface 1 of the actual space and may be fixedly supported on the floor surface.

The actual space may be defined by a ceiling surface 3, a side wall 2, and the floor surface 1. The smart drilling system may include at least two side walls 2, and edges of the side walls may be connected to each other via a drilling machine.

In order to map the design space to the actual space, a reference point 4 needs to be formed in the actual space. The smart drilling system may include the three reference points 4, in which case the reference points 4 may be respectively formed at different side walls. Coordinate information on the three reference points may be known, and thus, the total station may map the design space to the actual space by collimating the three reference points and mapping coordinate information recognized through collimation to the known coordinate information. That is, a transform matrix for mapping the design space to the actual space may be obtained.

In detail, when the total station 300 transmits obtained location information of the three reference points to the terminal 100, the terminal may map the design space for a drilling machine to the actual space through computation.

FIG. 1 illustrates a perforation point 5. The marked perforation point 5 may indicate the positioned at which perforation is to be performed, and a perforation point may not actually be visibly marked on the ceiling surface 3.

The terminal 100 may have information on the perforation location in the design space. That is, the terminal 100 may have a blueprint stored therein. The terminal 100 may control the operation of the drilling machine 200 based on the information on the perforation location. The drilling machine 200 may perform perforation according to the information on the perforation location through control of the operation of the terminal 100.

When the total station 300 recognizes location information of the three reference points of the drilling machine, the total station may not be moved. This is because, when the total station is moved, it is necessary to again perform recognition of the location information of the three reference points.

In contrast, the region within which it is possible to perform perforation at the current position of the drilling machine 200 is limited, and thus it may be necessary to move the entire drilling machine 200. For this reason, it may be necessary to recognize the current location of the drilling machine 200. The total station 300 may be configured to acquire location information of the drilling machine.

That is, the total station 300 may acquire location information of a reference point in an actual space and location information of a drilling machine in the actual space, and may transmit the acquired information to the terminal 100.

Figure 2:
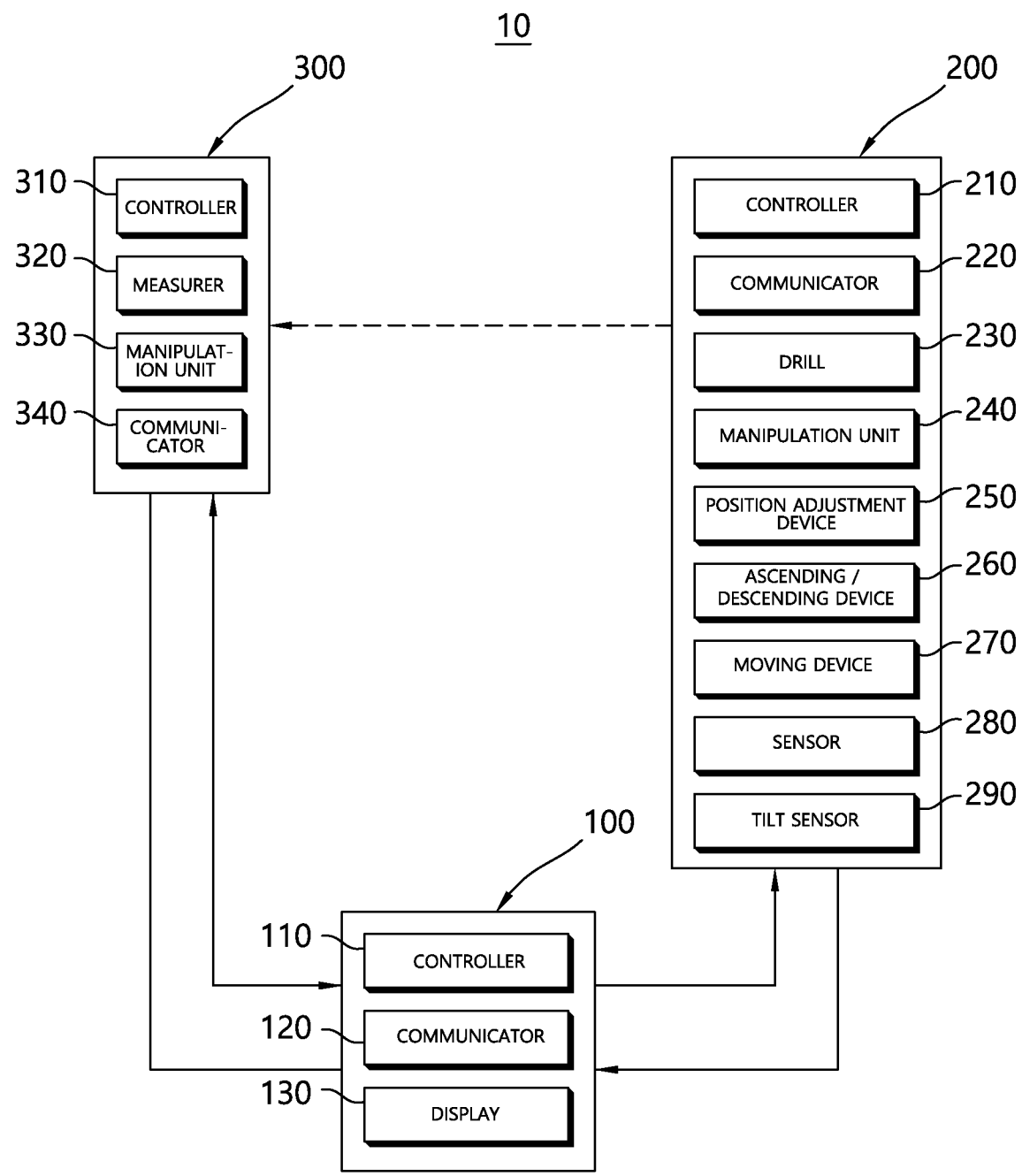
FIG. 2 is a diagram of the configuration of control of a smart drilling system according to an embodiment of the present disclosure.

FIG. 2 is a diagram of the configuration of control of a smart drilling system according to an embodiment of the present disclosure.

The terminal 100 may include a controller 110, a communicator 120, and a display 130. The controller 110 may include a processor for executing various computation tasks or control flows.

The communicator 120 may include a communication module for communication with the drilling machine 200 and the total station 300, and the communicator 120 may include a plurality of communication modules depending on the communication method.

The communicator 120 may include a communication module for wireless communication with the total station, and in detail, may include a long-distance communication module. For example, the communicator 120 may include a communication module for radio-frequency communication.

The communicator 120 may include a communication module for wireless communication with the drilling machine 200. In detail, the communicator 120 may include a short-distance communication module, for example, a Wi-Fi communication module and a Bluetooth communication module. Needless to say, a method of the communication module may also be changed.

The display 130 may have the function of a manipulation unit for allowing a worker to perform manipulation through click or touch. Needless to say, the display may have a display function of visibly displaying information. Thus, the display may also be referred to as a user interface (UI) for inputting information or a command and displaying information or a state.

The drilling machine 200 may include a drill 230 and a controller 210. The controller 210 may be configured irrespective of control of the operation of the drill 230. That is, control of the operation of the drill 230 may be performed through the terminal 100.

A communicator 220 of the drilling machine may be configured to communicate with the communicator 120 of the terminal and may include a Wi-Fi communication module and a Bluetooth communication module.

The drilling machine 200 may include a manipulation unit 240. The manipulation unit 240 may include a manipulation unit for applying power to the drilling machine, and as necessary may include a manipulation unit for an operation of an ascending/descending device 260 or a moving device 270, which will be described below.

Perforation through a drill may be performed by moving the drill in the depth direction of perforation as well as rotating the drill. In addition, there may be a plurality of perforation points, rather than a single point. Thus, it may be necessary to control the position of the drill along three axes. Accordingly, the drilling machine 200 according to the present embodiment may include a position adjustment device 250 for adjusting the position of the drill.

The position adjustment device 250 may be configured in various forms.

For example, an x-axis driving device, a y-axis driving device, and a z-axis driving device may be configured individually, and the position adjustment device may be embodied through these driving devices.

For example, the position adjustment device 250 may be a robot. That is, the position of a drill disposed on a distal arm may be adjusted through a plurality of arms. A joint may be disposed between the arms. That is, the position of the drill may be varied through rotational displacement at the joint. The position of the drill may be determined through a combination of rotational displacements at a plurality of joints.

Hereinafter, an example in which the position adjustment device is embodied as a robot will be described for convenience of description.

The drilling machine 200 may include the ascending/descending device 260. The height of a ceiling on which perforation is performed may be varied depending on the jobsite. The height capable of being covered by the robot 250 may be inevitably limited. Thus, it may be necessary to include the ascending/descending device 260 for raising and lowering the reference position of the robot 250.

The structure of the ascending/descending device 260 may be the same as or similar to the structure of the scaffolding. The ascending/descending device 260 may ascend and descend through electric motion. The ascending/descending device may be positioned below the robot 250.

The drilling machine 200 may include the moving device 270. The size of the actual space in which perforation is performed may be large, whereas the area capable of being covered by the fixed drilling machine 200 may be inevitably limited. Thus, it may be necessary to include a moving device for moving the reference position of the robot 250 in a horizontal direction.

The moving device 270 may include a wheel, and the drilling machine may be moved by pushing or pulling the drilling machine while holding a handle.

The moving device may be operated through electric motion.

The moving device may include a caterpillar track. The caterpillar track may allow the moving device to stably move because the area that contacts a floor surface is relatively very large. In addition, the drilling machine may be stably supported in a fixed state, and accordingly, vibration generated while drilling work is performed or when the robot 250 moves may be remarkably reduced. In addition, the area that contacts the floor surface is very large, and thus the caterpillar track may relatively and remarkably reduce the influence of the state of the floor surface (construction errors or a contamination state).

The drilling machine 200 may include a sensor 280. The sensor 280 may be configured to detect that the drill 230 comes into contact with the ceiling surface. When the drill 230 is moved upward and comes into contact with the ceiling surface, the sensor 280 may detect contact, or may detect vibration generated through contact.

When the robot 250 is driven, rotation at a joint may be performed. Thus, when rotation is limited, torque equal to or greater than a predetermined magnitude may be generated. In order to move the drill upwards, the joint needs to be rotated, and in this case, since rotation is limited, more torque than necessary may be generated. The time and position at which the drill comes in contact with the ceiling surface may be recognized by detecting this torque value.

The drilling machine 200 may include a tilt sensor 290. The drilling machine 200 may be configured to detect the horizontality of the drilling machine itself. Depending on the state of the floor surface, the drilling machine may be slightly inclined. Such a fine slope may be amplified, thereby generating a large error when actual perforation is performed.

Thus, the horizontality of the drilling machine may be detected through the tilt sensor 290, thereby correcting the error.

When the robot 250 is moved, vibration may be generated. The vibration may continue when the drill ascends to reach the ceiling surface at a margin position. In this case, a position error may occur when the drill comes into contact with the ceiling surface. Accordingly, whether vibration is generated may be recognized through the tilt sensor 290 before the drill ascends at the margin position.

When vibration is determined to be less than a tolerance through a value sensed by the tilt sensor 290, the drill may be controlled to ascend at the margin position. That is, the robot 250 may move the drill to the margin position, may stop operating until it is determined that vibration is removed, and may then move the drill upwards. Here, the value sensed by the tilt sensor 290 may be transmitted to the terminal 100 in real time. Accordingly, an error due to vibration may be reduced, the perforation location may be accurately calculated, and perforation may be performed to an accurate perforation depth.

The total station 300 may not be individually changed in order to be applied to an embodiment of the present disclosure. That is, the existing total station 300 may be used intact.

The total station 300 may include a controller 310 for basic control, a measurer 320, a manipulation unit 330, and a communicator 340. The measurer 320 may be configured to recognize location information of a measurement target by collimating or tracking the measurement target. The location information may be recognized by irradiating the measurement target with a laser beam.

The location information recognized by the total station 300 may be transmitted to the terminal 100 through the communicator 340.

The relationship between the terminal 100, the drilling machine 200, and the total station 300 will be described briefly.

The total station 300 may acquire the location information of the measurement target (an indoor space and a drilling machine) and may wirelessly transmit the acquired information to the terminal 100. The terminal 100 may control the movement, measurement, and state of the total station. That is, the terminal 100 may remotely control the operation of the total station.

The terminal 100 may remotely control the operation of the robot 250 and the drill 230. That is, control of the position of the drill and a driving control command of the drill may be performed through the terminal 100 rather than being performed by the controller 210 of the drilling machine 200.

The drilling machine 200 may transmit state information of the robot 250 to the terminal 100. That is, the drilling machine 200 may receive the state information of the robot from the terminal as feedback, and may more precisely control the robot.

The drilling machine 200 may transmit a detection value of various sensors to the terminal 100. For example, a detection sensor of a torque sensor and a detection value of a tilt sensor may be transmitted to the terminal 100 in real time.

It may not be desirable for the drilling machine 200 and the terminal 100 to transmit and receive information through a single communication module. This is because the type and amount of information that is transmitted and received through real-time communication is changed. Accordingly, a communication module for transmitting and receiving information such as a control command or state information corresponding to a control command between the terminal 100 and the drilling machine 200 and a communication module for transmitting a detection value of a sensor may be configured individually. The former communication module may be a Wi-Fi communication module, and the latter communication module may be a Bluetooth communication module.

Figure 3:
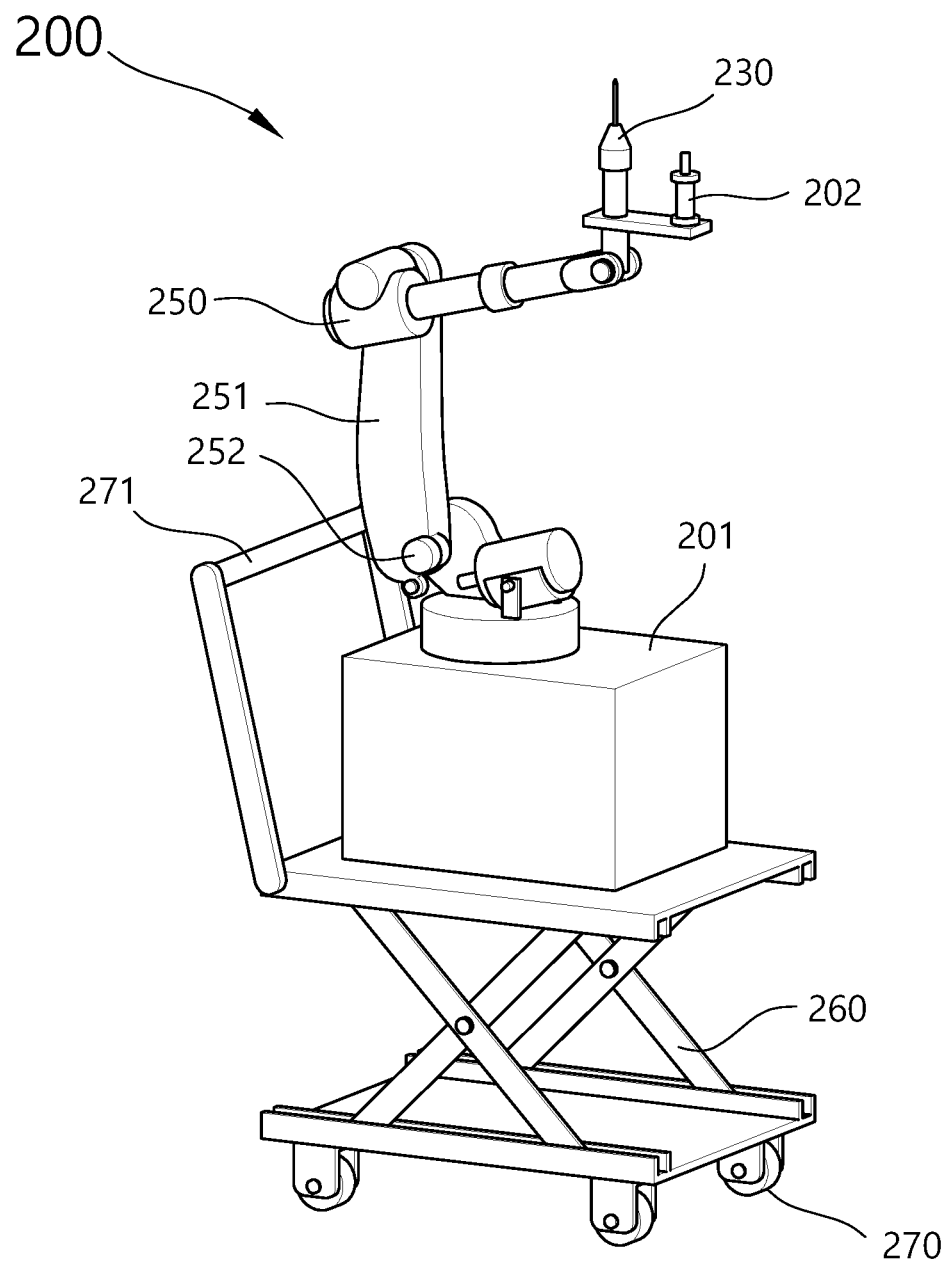
FIG. 3 is a diagram showing an example of a smart drilling machine according to an embodiment of the present disclosure.

FIG. 3 is a diagram showing an example of a smart drilling machine according to an embodiment of the present disclosure.

The drilling machine 200 may include a main body 201, the position adjustment device (robot) 250, the ascending/descending device 260, and the moving device 270. The main body 201 may include a robot computer built therein. That is, the controller 210 may be accommodated inside the main body 201, which is formed like a case. The communicator 220 may also be accommodated inside the main body 201.

The robot 250 may be positioned above the main body 201, and the ascending/descending device 260 may be disposed below the main body 201.

The drilling machine 200 may be horizontally moved by the moving device 270, and the ascending/descending device 260 may be disposed between the moving device 270 and the robot 250. Thus, the robot 250 and the main body 201 may stably ascend and descend by driving the ascending/descending device 260.

The moving device 270 may include a handle 271 that is held by a worker to push or pull the drilling machine.

The robot 250 may include a plurality of arms 251 and a joint 252 between the arms. The robot 250 may include three arms. A first arm may be connected to the main body 201, and the last arm (distal arm) may be connected to the drill 230.

The drill 230 may be fixed to the distal arm, and as the robot 250 is driven, the drill 230 may be moved three dimensionally.

In order to accurately control the position of the drill, the position of the drill needs to be accurately recognized. In order to recognize the position, a prism 202 may be included, and the prism 202 may be integrally moved with the drill 230. That is, a relative position change between the prism 202 and the drill 230 may be avoided. Thus, the drill and the prism 202 may be fixed together to the distal arm. In order to fix the prism, a rigid bracket may be used.

Although not shown, the drilling machine 200 may further include various components. For example, the drilling machine 200 may include a cleaner for removing dust generated during perforation work. A suction nozzle may be configured to surround a drill, and may be elastically deformed. That is, the suction nozzle may be adhered to a region around a perforation point to surround the perforation point, and the suction nozzle may be compressed and maintained to be adhered to the region when the drill is moved upwards during perforation work. Accordingly, dust generated during perforation work may be introduced into a main body of the cleaner through the suction nozzle.

The beginning of an operation of the cleaner may be operatively associated with an operation of the drill. That is, as soon as the drill is driven to rotate, the cleaner may start absorption. Even if rotation of the drill is terminated, remaining dust may also be present, and accordingly, after rotation of the drill is terminated and a short time elapses, the operation of the cleaner may be stopped.

Hereinafter, a method of controlling a smart drilling system according to an embodiment of the present disclosure will be described in more detail with reference to FIGS. 4 to 11.

Figure 4:
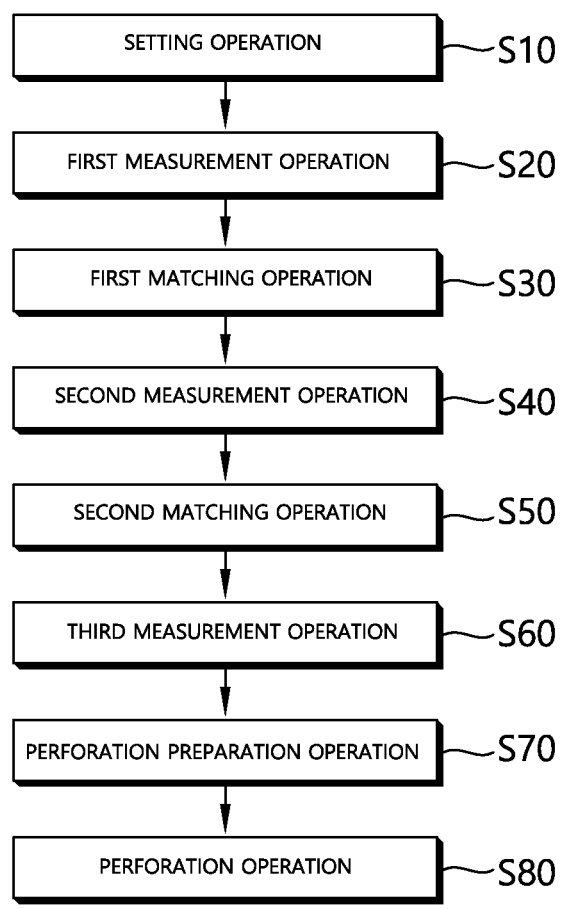
FIG. 4 is a flowchart of a method of controlling a smart drilling system according to an embodiment of the present disclosure.

Operations shown in FIG. 4 are described with reference to the display screen shown in FIGS. 5 to 11. Accordingly, first, a display of a terminal will be described in detail with reference to FIG. 5.

Figure 5:
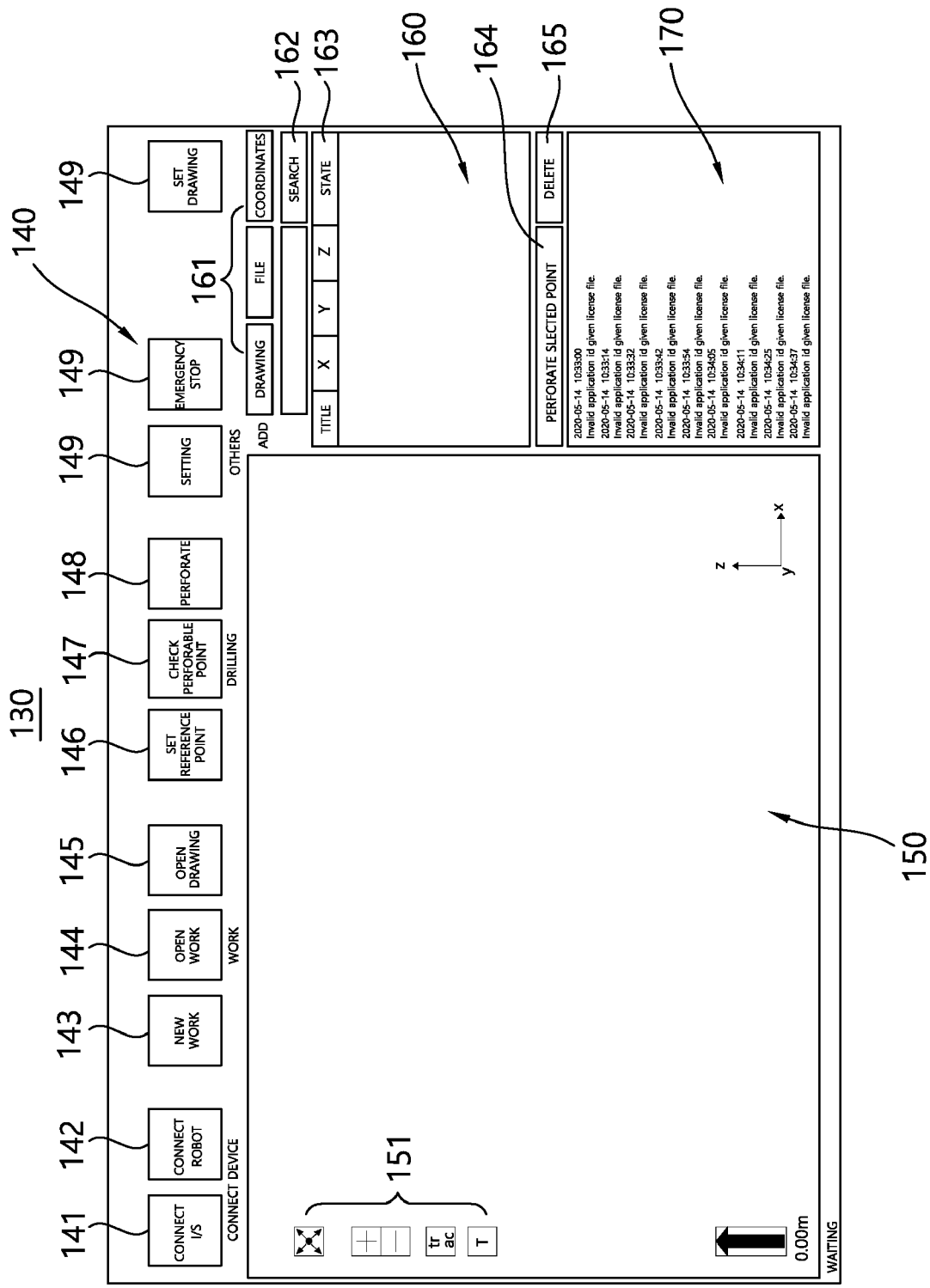
FIG. 5 is a diagram showing a display of a terminal in an initial state.

As shown in FIG. 5, the terminal may include the display 130 or a screen. This may be referred to as a display, and a user interface may be embodied through the display.

The display 130 may be divided into respective regions. That is, the terminal may separately display a menu region 140 and a display region 150. The terminal may include a perforation coordinate display region 160 separately from the menu region 140 and the display region 150. The terminal may include a state display region 170 separately from these regions.

As shown in the drawings, the menu region 140 may be positioned above the display region 150, which occupies the greatest portion thereof, and the perforation coordinate display region 160 and the state display region 170 may be positioned at one side of the display region.

The display region 150 may display a view having perforation location information, location information of the total station, and location information of the drilling machine through mapping information between the design space and the actual space. The perforation location information, the location information of the total station, and the location information of the drilling machine may be sequentially added and displayed in one view, which will be described below.

The display region 150 may include a submenu 151 for zooming in/out, rotation, and viewpoint conversion of the view. The display region 150 may display coordinates of the view. That is, x, y, and z axes may be displayed. The viewpoint of the view may be easily recognized through rotation around the x-, y-, and z-coordinate axes.

The menu region 140 may include menus 141 and 142 for connecting the terminal to external devices. In addition, the menu region 140 may further include work menus 143, 144, and 145 for importing perforation coordinates for perforation work.

The menu region 140 may include menus for perforation, and may also include additional menus. Each menu will be described below in detail.

Menus included in the menu region 140 may be arranged in the order of the perforation work. That is, generally, menus required for settings for starting the perforation work may be arranged on the left side, and menus for a command for the perforation work may be arranged on the right side.

The perforation coordinate display region 160 may display the coordinates of a perforation point in numerical form. In addition, the perforation coordinate display region 160 may display the names of perforation points in order to distinguish therebetween. These information items may be displayed like a spreadsheet having a plurality of columns 163 with respect to each perforation point.

The perforation coordinate display region 160 may include a submenu 161 for adding a perforation point separately from the work menus 143, 144, and 145 of the menu region 140.

The perforation coordinate display region 160 may include a selected point perforation menu 164 separately from a perforation menu 148 of the menu region 140. The perforation menu 148 may be a menu for a plurality of perforation mode commands, and the selected point perforation menu may be a menu for a single perforation mode command.

The state display region 170 may display the detailed progress of processers related to the perforation work through text or a symbol.

As shown in FIG. 4, the method of controlling a smart drilling system according to an embodiment of the present disclosure may include a setting operation S10 of operatively associating the terminal 100, the drilling machine 200, and the total station 300, which are separately configured, with one another.

In detail, the setting operation may be an operation of connecting a total station and a drilling machine through communication and displaying perforation location information in a design space by a terminal.

As shown in FIG. 5, when a worker pushes a T/S connection menu 141 of the menu region 140, the terminal may be connected to a total station positioned around the terminal for communication. The terminal and the total station may be connected for communication via a radio frequency. In this case, an active window and other components that are not shown may be generated, whereby radio-frequency communication may be performed.

When a robot connection menu 142 is selected after connection with the total station, the terminal and a drilling machine positioned around the terminal may be connected through communication. In this case, an active window and other components that are not shown may be generated, whereby Wi-Fi connection or Bluetooth connection may be established.

The order in which the total station and the robot are connected to each other may vary. The menu color before connection is completed and the menu color after connection is completed may be different from each other. For example, before connection, the menu may be displayed in a green color, and after connection, the menu may be displayed without color.

The menu region 140 may include the work menus 143, 144, and 145 for collectively inputting coordinate points of perforation for performing the perforation work.

The work menu may be a menu for separating a plurality of actual spaces in which the perforation work is to be performed.

Figure 6:
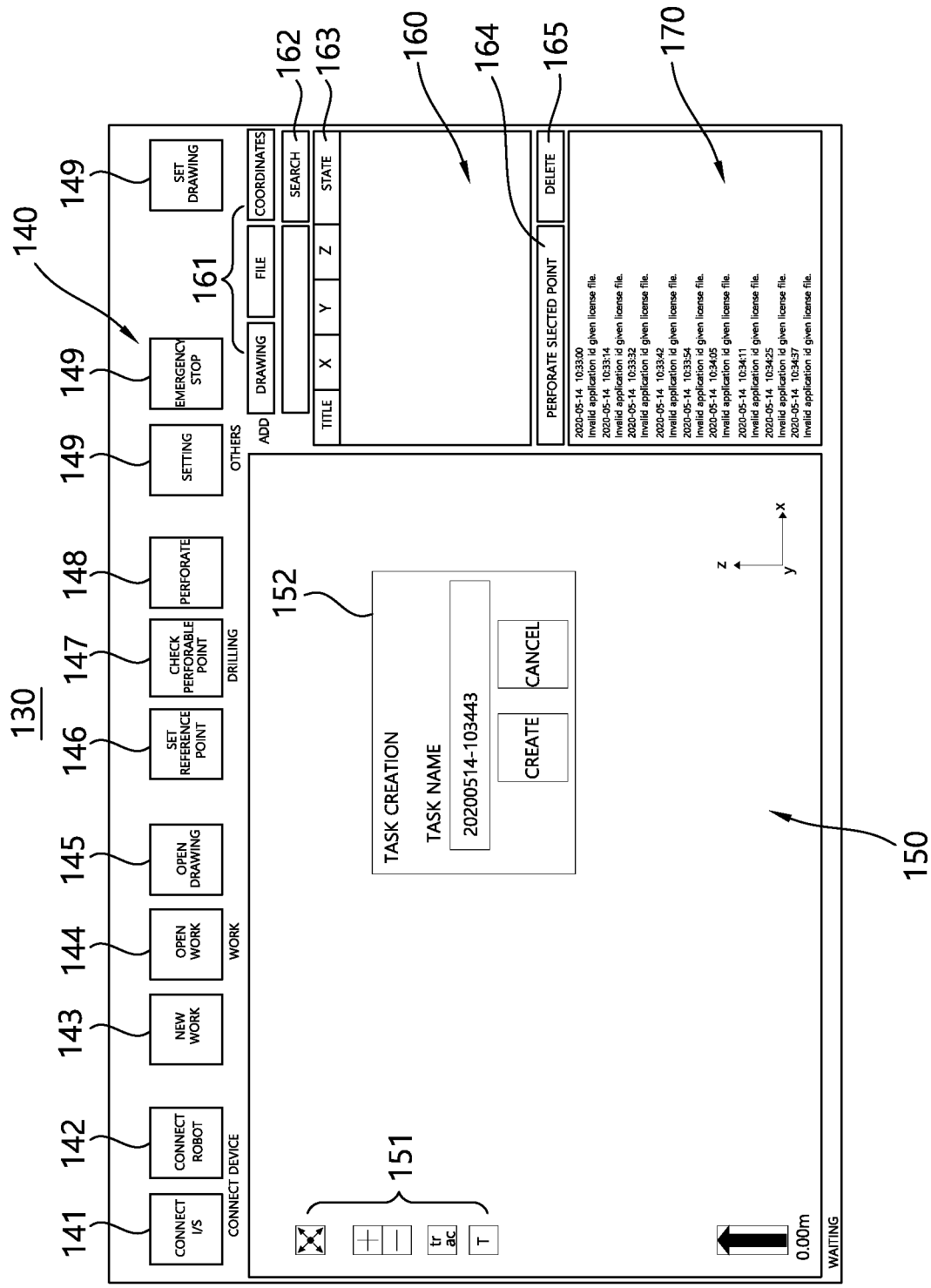
FIG. 6 is a diagram showing a display of a terminal when the display of the terminal displays task creation for performing perforation work.

As shown in FIG. 6, when a new task menu 143 is selected, an active window 152 may be displayed on a display region. A new task name may be created by writing a task name on the active window.

A worker may separate a series of tasks and may create task names in consideration of the schedule of the entire perforation work. The task names may be created to classify a plurality of actual spaces into various sectors. The floor on which the perforation work is to be performed and the task names may be created in the form of sections obtained by classifying the corresponding floor.

Whenever a new work is performed, a task name may be created, or the entire perforation work may be divided in advance and a plurality of task names may be created in detail.

When the task name is created, a drawing open menu 145 corresponding to the corresponding task name may be selected. That is, a blueprint having location information of a perforation point may be imported and may be matched with the corresponding task name.

When perforation work which corresponds to the created work is not terminated, the current state may be stored, and then a task open menu 144 may be selected to select an existing task.

Figure 7:
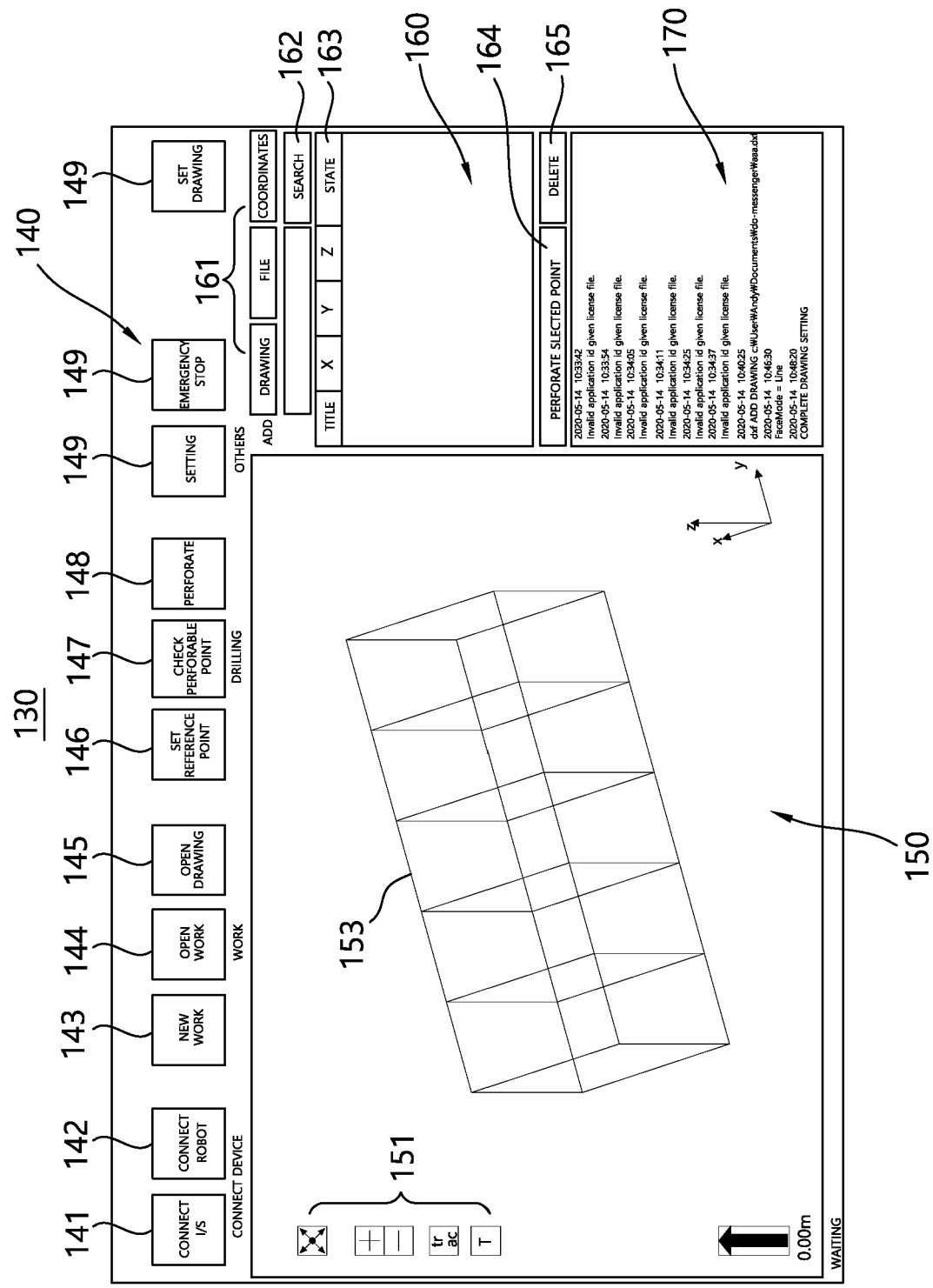
FIG. 7 is a diagram showing a display of a terminal after a drawing is opened.

FIG. 7 illustrates an example in which the drawing open menu 145 is selected and the selected drawing is displayed on the display region 150.

A drawing displayed through the drawing open menu 145 may be a drawing of the entire actual space. That is, the displayed drawing 153 may be a drawing including a perforation point or a drawing of a background on which the perforation point is to be formed.

Depending on the designer, the perforation points may be displayed in various forms. Accordingly, it may be necessary to extract the perforation point from the entire drawing. Extraction of the perforation point may be performed in various methods such as a method of designating a region, a method of designating the shape of a perforation point, or a method of selecting perforation points one by one.

Figure 8:
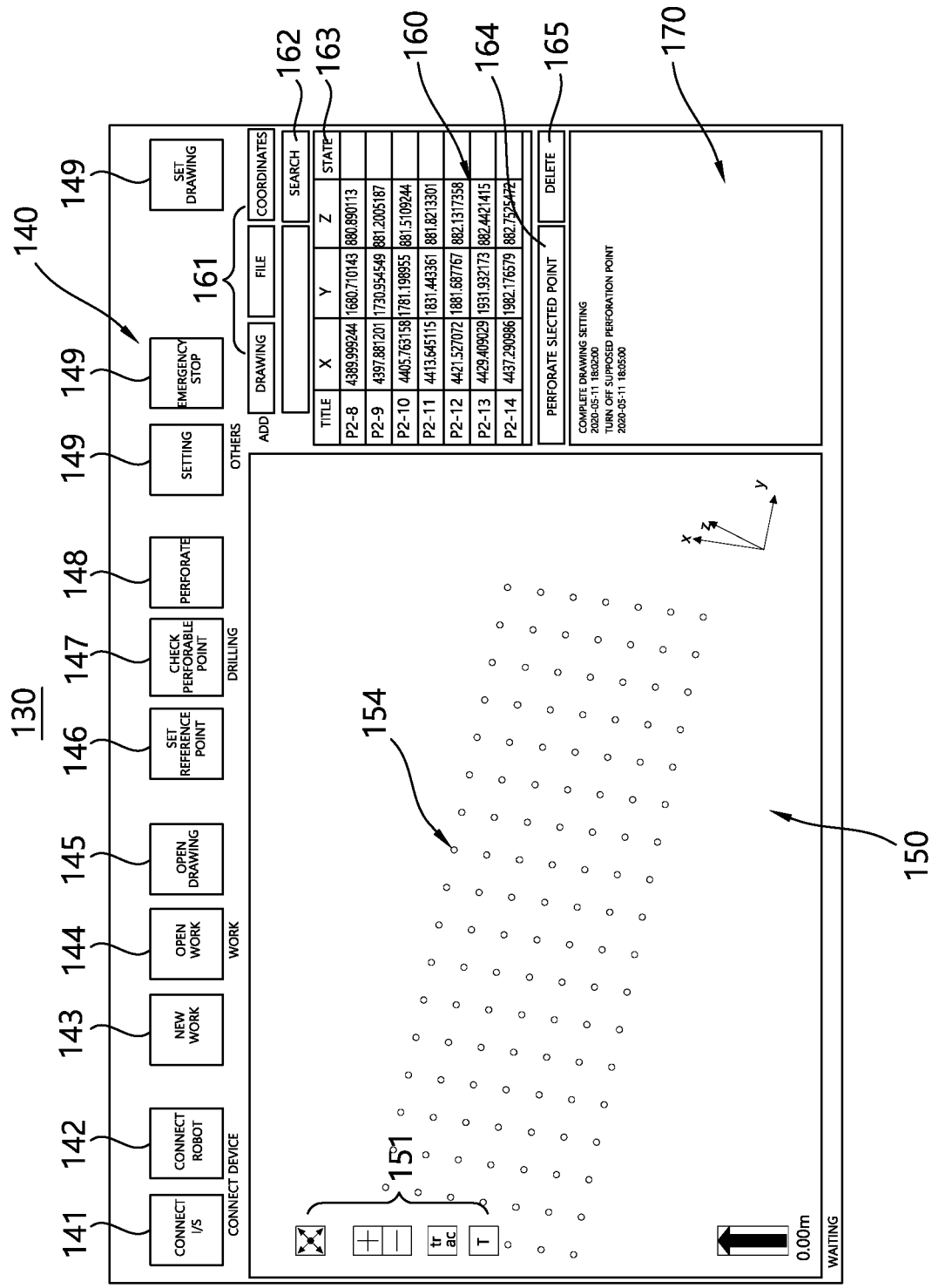
FIG. 8 is a diagram showing a display of a terminal after a perforation point is extracted from a drawing.

When the perforation points are extracted, perforation points may be displayed in the menu region 140 as shown in FIG. 8. In addition, a perforation point name, xyz coordinates, and a perforation point state may be displayed in the form of a drawing in the perforation coordinate display region.

A displayed view may be zoomed in and out, whereby the positions and number of all perforation points may be visibly recognized.

The display screens shown in FIGS. 5 to 8 may correspond to sequential operations of the setting operation S10 shown in FIG. 4. The shown operations may include an operation of recognizing and displaying a drawing as a reference for work through a series of procedures by a terminal. In addition, the operations may include an operation of connecting the total station and the drilling machine to the terminal.

Here, an operation of opening a drawing may be performed in advance, and then an operation of connecting the total station and the drilling machine may be performed.

For perforation, the actual space and the design space need to be mapped to each other. To this end, the total station needs to perform a first measurement operation S20 of acquiring location information of a reference point of the actual space and transmitting the same to the terminal. The menu region 140 may include a reference-point setting menu 146. The reference-point setting menu may be selected, and the total station may acquire location information of three reference points in the actual space. An active window in a voice or menu region may guide a worker to sequentially collimate the three reference points, and may indicate that the location information of the reference points is received.

The actual coordinates of the three reference points may be known. That is, the three reference points may be points mapped to three reference points specified in the design space. Accordingly, when the total station acquires location information of the three reference points, the position of the total station may be recognized through triangulation.

Figure 9:
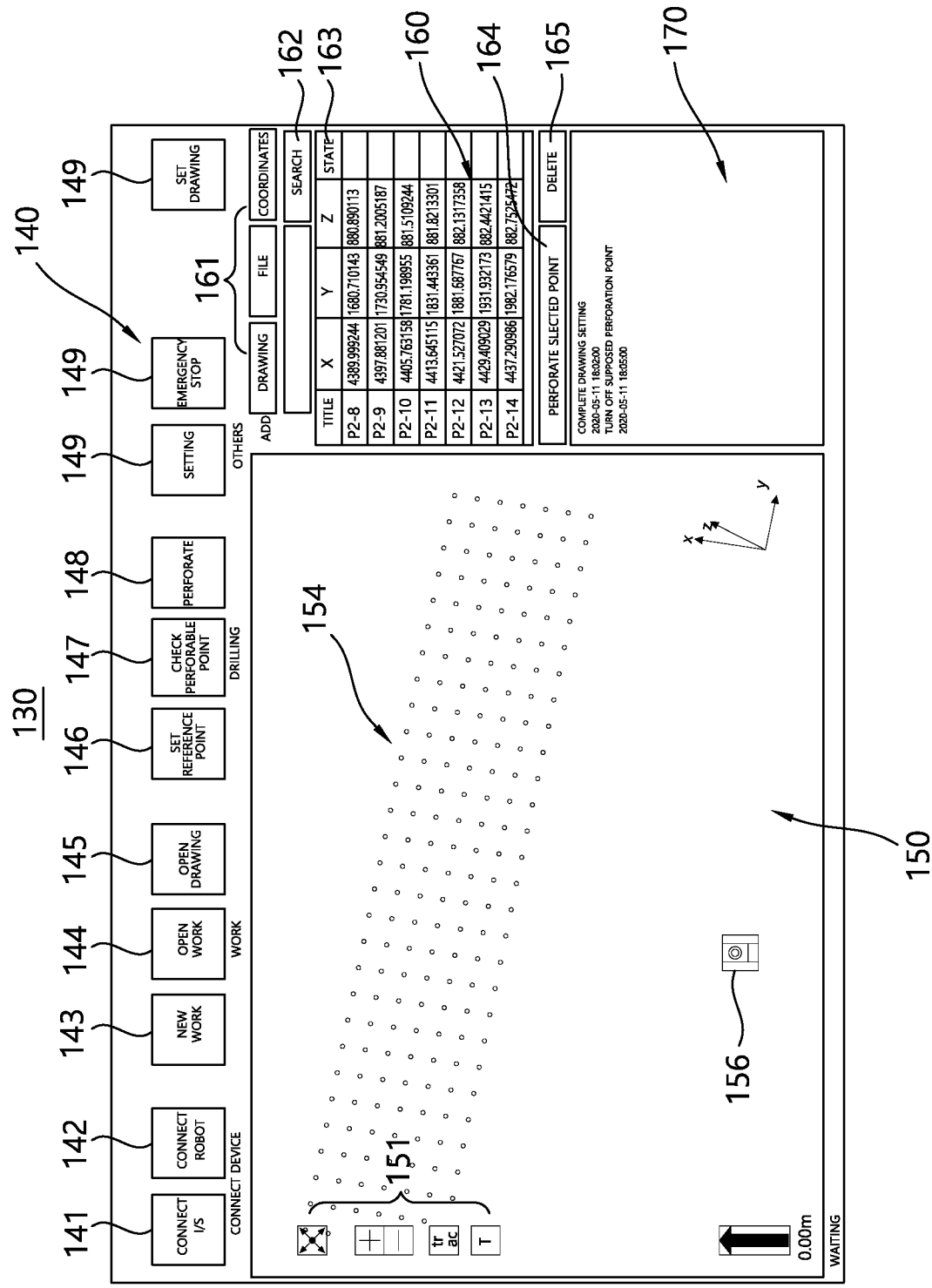
FIG. 9 is a diagram showing a display of a terminal after connection with a total station.

As shown in FIG. 9, when the total station acquires the location information of the three reference points and transmits the acquired information to the terminal, the terminal may map the actual space to the design space and may display the total station at the corresponding position (S30).

That is, a first matching operation S30 may be performed. The total station may be displayed in the form of an icon 156 in the display region 150. That is, information about the location of perforation points and location information of the total station may be visibly displayed in the display region.

Thus, the first measurement operation S20 may be started by selecting the reference-point setting menu 146 and the first matching operation S30 may be terminated by displaying the icon 156 of the total station in the display region.

The drilling machine may perform perforation based on designed location information of the perforation point in the actual space. Thus, the position of the drilling machine in the actual space needs to be mapped to the position of the drilling machine in the design space.

To this end, a second measurement operation S40 may be performed. That is, the total station may acquire the location information of the drilling machine and may transmit the acquired information to the terminal. In this case, the location information of the drilling machine may be acquired at the home position of the drilling machine. Then, when the total station transmits the location information of the drilling machine to the terminal, the terminal may perform a second matching operation of displaying the position of the drilling machine through mapping. The state in which the second matching operation is completed is shown in FIG. 10.

Figure 10:
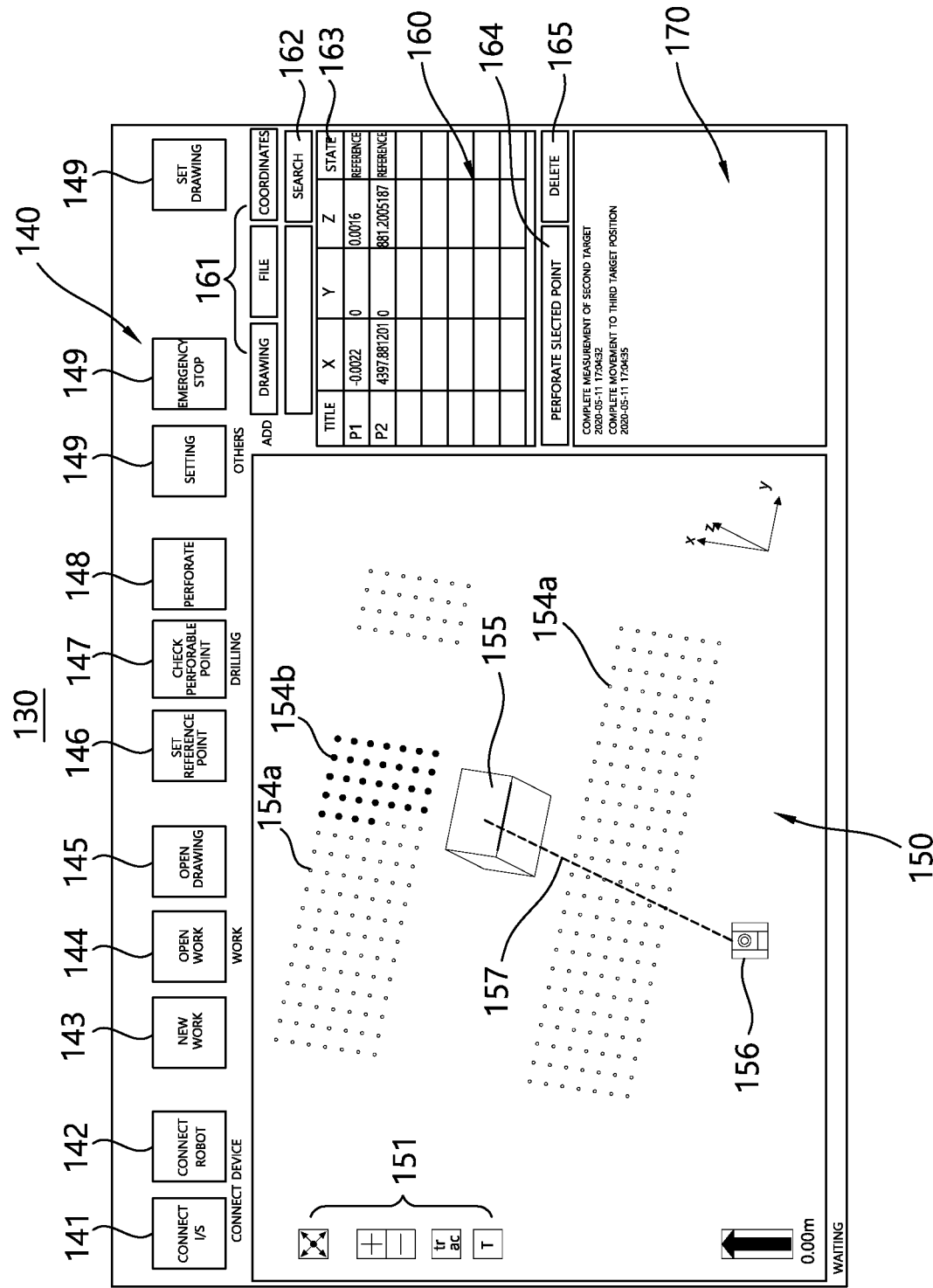
FIG. 10 is a diagram showing a display of a terminal after connection with a smart drilling machine.

FIG. 10 shows location information of a perforation point, location information of a total station, and location information of a drilling machine together. As such, perforation preparation may be completed.

FIG. 10 shows a collimation line 157. That is, it may be seen that a prism is positioned on a drilling machine icon 155 at the home position of the drilling machine. In other words, it may be seen that the collimation line is formed between the total station and an internal region of the drilling machine icon. As seen from FIG. 10, all of the perforation points, the drilling machine, the total station, and the collimation line are displayed as one view by zooming out the view.

Accordingly, after a second matching operation S50 is performed, a perforation operation S80 may be performed.

Perforation may be performed by a drill. That is, perforation may be performed by the drill through rotation driving and vertical movement of the drill, which is electrically (automatically) performed rather than being manually performed. It may be very inefficient to move the entire drilling machine whenever a single perforation point is perforated and then another perforation point is perforated. In other words, it may be desirable to perforate all perforation points while minimizing horizontal movement of the drilling machine in the actual space.

To this end, the menu region 140 may include a perforable point verification menu 147. Through the perforable point verification menu, a perforable region or perforable points at the current position of the drilling machine may be recognized.

In detail, a third measurement operation S60 of acquiring location information of three drilling-machine (robot) work regions may be performed. The third measurement operation may be an operation of operating the drilling machine to occupy positions of three different work regions and acquiring the location information at each of the work region positions through the total station.

The third measurement operation S60 may be performed in order to convert a drilling machine (robot) coordinate system into a design space coordinate system. When only the position of the reference point of the drilling machine (robot) is recognized, the orientation of the drilling machine (robot) may not be capable of being recognized. That is, when the orientation of the drilling machine is recognized, a work region of the drilling machine at the current position of the drilling machine may be recognized. To this end, it may be necessary to acquire location information of three different work regions.

The acquired location information may be transmitted to the terminal 100. Here, a work region position may be preset. Thus, the specifications of a region in which the drilling machine is capable of performing work may be preset, and thus the drilling machine (robot) coordinate system may be converted into a design space coordinate system through the location information items, and the region in which the drilling machine is capable of performing work at the current position may be recognized.

Accordingly, the terminal may perform a perforation preparation operation S70 of displaying a perforable region or a perforable point in a display region at the current position of the drilling machine.

Figure 11:
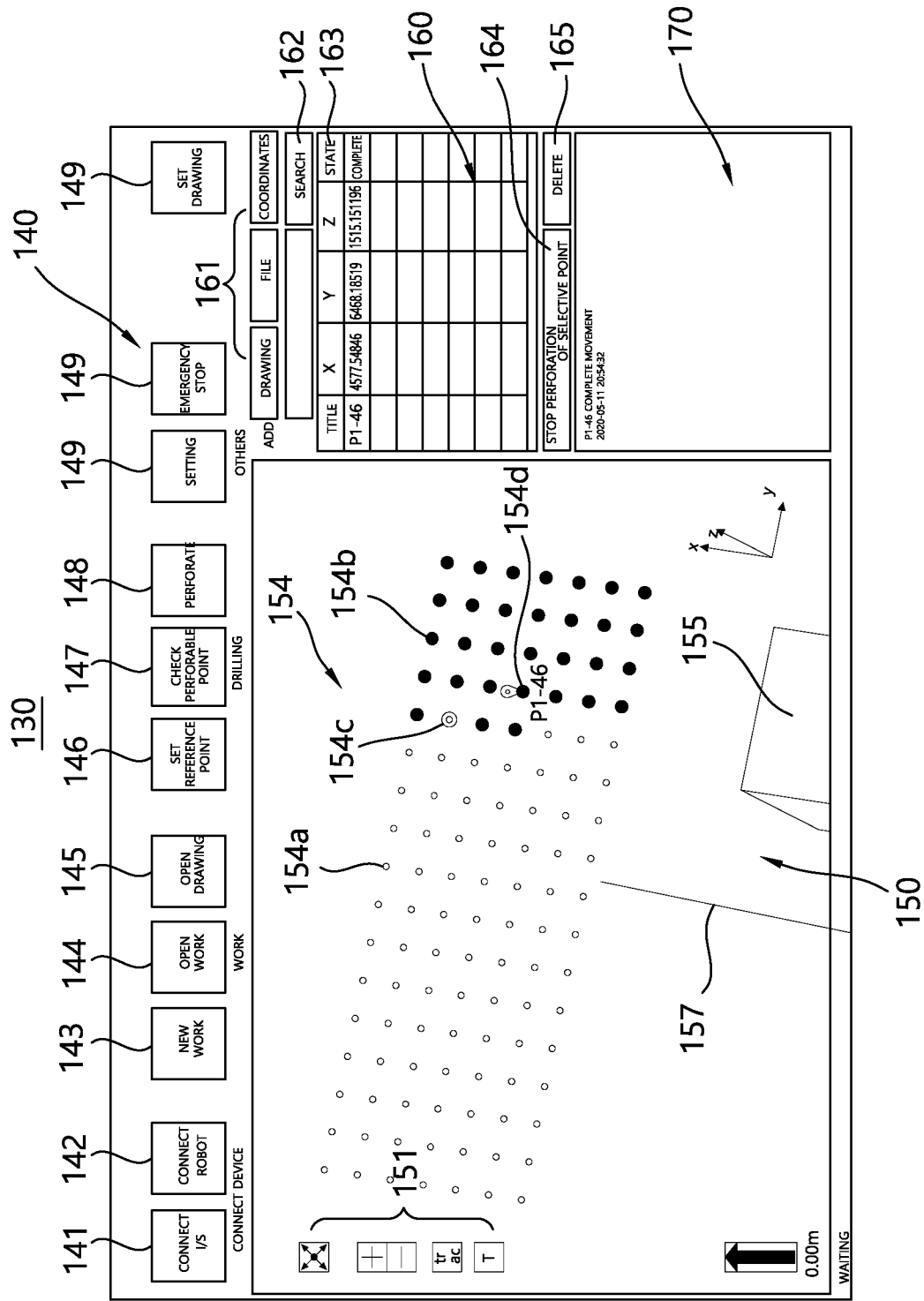
FIG. 11 is a diagram showing a display of a terminal while perforation work is being performed.

As shown in FIGS. 8 and 9, all perforation points 154 may be displayed in the display region, and as shown in FIG. 11, a perforable point 154*b* and a remaining perforation point 154*a* may be mutually distinguishably displayed. Also, a perforating point 154*d* and a next perforation point 154*c* may be displayed in the display region That is, the perforable point may be recognized at the current location of the drilling machine.

When the perforable point is displayed, the perforation operation S80 may be performed. That is, when the perforation menu 148 is selected, perforation may be performed. In this case, perforable points may be sequentially perforated. That is, perforation through the perforation menu 148 may be referred to as a multiple perforation mode.

As perforation is performed, the robot 250 may be moved, and thus, the position of the prism may be varied. Thus, the position of the collimation line may be varied. On the other hand, the positions of the total station and the drilling machine may be fixed on the display, as well as the actual space.

As shown in FIG. 11, as perforation is performed, all of the perforation points, the perforable points, the perforated points, and the point being perforated may be visibly differently displayed.

The perforable point may be displayed with a red-filled circle, and the perforated point may be displayed with a green-filled circle. The point being perforated may be displayed with yellow, and the remaining perforation point but not the perforable point may be displayed with an empty circle. Needless to say, the shapes and colors for identification thereof may be changed.

Thus, a worker may very intuitively recognize the current state of the perforation work while viewing the display.

The perforation coordinate display region may display the state of each perforation point through text or a symbol.

The perforable point may be recognized at a specific position of the drilling machine, and accordingly, the number of times the drilling machine moves horizontally may be greatly reduced. However, in the situation in the field, a perforation point may be added, or only a single perforation point but not a plurality of perforation points may be perforated.

To this end, according to the present embodiment, a single perforation mode as well as a multiple perforation mode may be provided. In addition, a method of adding different types of perforation points as well as extracting (adding) all perforation points through open drawing may be provided.

For example, a method of adding a small number of perforation points or a single perforation point may be provided.

The perforation coordinate display region 160 may include the submenu 161 for adding a perforation point. The submenu may be configured to select at least one of addition of a perforation point through a drawing, addition of a perforation point through a spreadsheet file, and addition of a perforation point through a coordinate input. In addition, the submenu may include a search menu 162 configured to search a database in order to add a perforation point.

At an actual site, a 3D blueprint and a 2D blueprint may be used, and the perforation point may be provided only by a 2D blueprint, a spreadsheet file, or the like. A background drawing as an example of the 3D blueprint may be imported through the drawing open menu 145, which is a main menu, information on a perforation point may be imported from the submenu, and the background and the perforation point may be mapped to each other and may be displayed in the display region. Accordingly, even if a field environment or a design environment is changed, the changed field environment or design environment may be flexibly responded to.

The perforation coordinate display region 160 may include a single-perforation-mode-menu 164. For example, the single-perforation-mode-menu 164 may be configured as a selected point perforation menu. When the selected point perforation menu is selected, perforation of a selected point may be performed, and in this case, the selected point perforation menu may be changed to a selected point perforation stop menu. When the selected point perforation stop menu is selected, only perforation of a selected point may be stopped.

It may be necessary to delete the extracted or added perforation point. When an incorrect perforation point is input, it may be necessary to delete only a corresponding perforation point. To this end, a delete menu 165 may be included.

When a corresponding perforation point is selected and activated in the perforation coordinate display region and then the delete menu 165 is selected, only the corresponding perforation point may be deleted.

The menu region may include a plurality of other menus 149, and for example, may include an emergency stop menu. The emergency stop menu may be a menu for stopping driving of the drilling machine in the case of emergency.

When the drilling machine terminates all perforation tasks at a specific position, the terminal may perform notification. A user may move the drilling machine to a region nearby the region in which perforation is terminated. In this case, the terminal may display the moving route of the drilling machine in real time. This is because the drilling machine is tracked in real time.

When the drilling machine is moved to a nearby position, the third measurement operation S60 and the perforation preparation operation S70 may be performed, and then the perforation operation S80 may be performed again.

FIG. 10 illustrates about 220 perforation points and about 30 perforable points. It may be possible to perforate about 30 perforation points at the current position of the drilling machine, and thus it may be seen that all perforation points are capable of being perforated by moving the drilling machine about 6 to 8 times arithmetically.

Accordingly, when a large amount of perforation is performed, very efficient and effective perforation may be performed.

The case in which a multiple perforation mode and a single perforation mode are executed in the aforementioned perforation operation S80, and thus a separate selection menu is included, has been described.

It may be important to accurately match the perforation point and to perform perforation, but it may also be important to accurately match a perforation depth and to perform perforation. For example, the ceiling surface on which perforation is to be performed may be positioned about 1 cm higher than a design location due to a construction error. In this case, when the designed perforation depth is 3 cm, the actual perforation depth needs to be 2 cm according to accurate coordinate mapping.

However, in this case, the perforation depth is not the same as the designed depth, and thus an anchor bolt may not be sufficiently fixed. In other words, despite of the construction error, actual perforation may be performed to the designed perforation depth.

The present embodiment may provide a smart drilling machine, a smart drilling system, and a method of controlling the smart drilling system for performing perforation to an accurate perforation depth despite a construction error.

To this end, the drilling machine may be driven to distinguish a home position, a margin position for a perforation point, a contact position of a ceiling surface, and a perforation location. The terminal may drive and control the drilling machine to be distinguished at these positions.

As described above, the home position of the drilling machine may be a home position of the robot 250, and may be any one of three work region positions.

The margin position may refer to a position spaced apart downwards from a deigned position of a perforation point by a preset distance in consideration of a construction error. For example, the margin position may refer to a position spaced apart downwards from a designed perforation start point of perforation by about 5 to 10 cm. When a construction error is very small, the margin position may also be set to be small.

While being moved upwards to the margin position, the drill may come into contact with the ceiling surface at any moment. The total station may recognize the position of the ceiling surface with which the drill comes into contact, and may recognize the time at which the drill comes into contact with the ceiling surface through a sensor. Thus, the position of the ceiling surface with which the drill comes into contact may be set to a start point of perforation, and perforation may be performed to the designed perforation depth.

When there is no error in construction of the ceiling surface, the designed start point of perforation may be the position of the ceiling surface with which the drill comes into contact. When the ceiling surface is constructed higher than designed, the drill may come into contact with the ceiling surface at a higher position than the designed start point of perforation. Accordingly, in this case, the start point of perforation (reference point of perforation depth) may also be changed, and thus perforation may be performed to an accurate perforation depth.

The position of the drill will be described in more detail.

When the entire drilling machine is moved, the drill may be positioned at the lowest position. This may be referred to as the home position of the drilling machine.

In order to perform perforation, a robot may be moved in order to move the drilling machine to a margin position. In addition, the drill may be moved upward to the position of the ceiling surface with which the drill comes into contact from the margin position. This start of upward movement may be performed when vibration is determined to be negligible through a tilt sensor.

When the drill comes into contact with the ceiling surface, the point may be recognized as the start point of perforation, and normal perforation may be started. That is, after the drill comes into contact with the ceiling surface, the drill may start being rotated and driven. In response to rotation and driving of the drill, the drill may be driven to be vertically pushed.

The drill may terminate perforation at the perforation location, and may be then moved to the home position of the drill. That is, the drill may return to the initial position thereof.

Here, it may be seen that a change in the position of the drill is appropriate for perforation of a single perforation point. That is, it may be seen that safe and accurate perforation is possible. However, it may be seen that, assuming that a gap between the home position and the perforation location is large, the time taken to move the robot for perforation is longer than the time taken to actually perform perforation.

Accordingly, a drill position control pattern in a single perforation mode and a drill position control pattern in a multiple perforation mode may be different from each other.

A drill position control pattern for first perforation of a first point and a drill position control pattern after the last perforation may be the same in the single perforation mode and the multiple perforation mode. However, when intermediate perforation is performed and then next intermediate perforation is performed in the multiple perforation mode, the drill position control pattern may be changed.

In detail, after the intermediate perforation, the drill may be moved to a next margin position of the perforation point rather than returning to the home position. Then, the contact position of the ceiling surface may be checked at the margin position, and perforation may be performed. This repetition may be performed up to the last perforable point perforation, and after the last perforable point perforation, the drill may return to the home position. Then, the entire drilling machine may be horizontally moved to a nearby position.

The time taken to perforate a plurality of perforation points may be remarkably reduced by minimizing driving in which the drill returns to the home position in the multiple perforation mode.

When perforation is performed in the actual space, a change in the position of the total station may be minimized. That is, when the position of the total station is fixed in the actual space, the movement of the entire drilling machine in the actual space may be recognized. In other words, the total station may always track the prism included in the drilling machine. Accordingly, some components of the drilling machine, for example, the drill, the cleaner nozzle, or the position adjustment device, may not be interposed between the prism and the total station.

Accordingly, the position of a reference point of the drilling machine or the positions of a work region of the drilling machine may be set in such a way that the prism and the total station always face each other with respect to the circumference of the drilling machine, i.e., 360 degrees. Accordingly, the present disclosure also proposes that the total station be installed within a desirable height range.

That is, when the total station is installed in a set height range or at a set height, an obstacle between the prism of the drilling machine and the total station may be avoided at the position of the reference point of the drilling machine and the position of the work region. In other words, the position of the reference point and the position of the work region may be preset to avoid the obstacle.

Accordingly, it may not be necessary to frequently move the position of the total station.

In the drilling machine coordinate system, an obstacle between the prism of the drilling machine and the total station on a moving route of the drill, that is, a moving route of the drill in the work region, may be avoided. In other words, moving routes may be preset assuming that the obstacle will be avoided.

However, an obstacle may be introduced during drilling work of the drilling machine at some positions of the drilling machine due to a structural problem of the position adjustment device or the drilling machine. For example, in the state in which the drilling machine is rotated 180 degrees, an obstacle may be introduced. That is, in a specific posture of the drilling machine (a specific horizontal angle with respect to the total station, for example, 180 degrees), the obstacle may be introduced between the prism and the total station during a procedure in which the drill performs perforation. This specific posture may be referred to as a dead zone, and guidance may be performed to prevent the dead zone from being generated in order to continuously track the prism.

Accordingly, the drilling machine may be moved in the actual space and may be guided to avoid the state in which the drilling machine is rotated by 180 degrees in terms of the relationship between the drilling machine and the total station. As such, the total station may track the prism at the reference position of the drilling machine, the position of the work region position, and all positions at which the drill is moved to perform drilling work.

The present disclosure may provide a drilling machine, a drilling system, and a method of controlling the drilling system for more accurately, rapidly, and safely performing perforation work.

An embodiment of the present disclosure may provide a drilling machine, a drilling system, and a method of controlling the drilling system for collectively setting a plurality of perforation points and also setting a specific single perforation point as necessary.

An embodiment of the present disclosure may provide a drilling machine, a drilling system, and a method of controlling the drilling system for automatically perforating a plurality of perforation points and also automatically perforating a specific single perforation point as necessary. As such, an embodiment of the present disclosure may provide a drilling machine, a drilling system, and a method of controlling the drilling system for flexibly responding to the situation in the field.

An embodiment of the present disclosure may provide a drilling machine, a drilling system, and a method of controlling the drilling system for flexibly applying design information for a perforation point provided in various forms. As such, an embodiment of the present disclosure may provide a drilling machine, a drilling system, and a method of controlling the drilling system which are easily used even if the situation in the field or a design changes.

An embodiment of the present disclosure may provide a drilling machine, a drilling system, and a method of controlling the drilling system for easily connecting a drilling machine and a total station through a personal computer (PC) (terminal) for controlling the drilling machine and the total station and simultaneously easily recognizing state information of the drilling machine and the total station.

An embodiment of the present disclosure may provide a drilling machine, a drilling system, and a method of controlling the drilling system for reducing the time taken to perforate all perforation points by minimizing movement of the drilling machine when all of the perforation points are perforated.

An embodiment of the present disclosure may provide a drilling machine, a drilling system, and a method of controlling the drilling system for recognizing an optimum moving route for moving a drilling machine by recognizing a perforable point at the current position of the drilling machine and displaying the perforable point on a PC (terminal).

An embodiment of the present disclosure may provide a drilling machine, a drilling system, and a method of controlling the drilling system for allowing a worker to intuitively recognize the current state of perforation work by mutually distinguishably displaying all of the perforation point, the perforable point, the perforated point, and the point being perforated.

An embodiment of the present disclosure may provide a drilling machine, a drilling system, and a method of controlling the drilling system for reducing the time taken to recognize the perforable point by setting any one of three reference points for recognizing a work region of the drilling machine as a reference position point of the drilling machine.

An embodiment of the present disclosure may provide a drilling machine, a drilling system, and a method of controlling the drilling system for reducing the time taken to perform perforation by minimizing the moving route of a position adjustment device of a drilling machine between perforation tasks when perforation is continuously performed.

An embodiment of the present disclosure may provide a drilling machine, a drilling system, and a method of controlling the drilling system for performing perforation to an accurate depth at an accurate position despite an error based on the state of a floor surface on which the drilling machine is positioned, a construction error such as a ceiling surface on which perforation is performed, or vibration.

An embodiment of the present disclosure may provide a drilling machine, a drilling system, and a method of controlling the drilling system for minimizing a change in the control logic of the drilling machine and the total station by acquiring state information of the drilling machine via real-time communication with the drilling machine and controlling an operation of the drill and the position adjustment device of the drilling machine by a PC (terminal), and acquiring the location information of the drilling machine via real-time communication with the total station by the PC (terminal).

What is claimed is:

1. A smart drilling system comprising:
   an external terminal configured to map a design space to an actual space and having perforation location information in the design space;
   a drilling machine comprising a single prism and a drill for perforation and configured to perform perforation in the actual space based on the perforation location information under control of the terminal based on the perforation location information, wherein the single prism is rigidly fixed to and is spaced apart from the drill by a bracket; and
   a total station configured to acquire location information of a reference point in the actual space for mapping the design space to the actual space and location information of the drill and the drilling machine in the actual space through tracking the prism, and to transmit the location information of the reference point in the actual space and the location information of the drill and the drilling machine to the terminal, wherein the total station is fixedly positioned on a floor surface of a construction site, wherein the drilling machine is moved to positions of three different work regions, and the total station sequentially acquires location information of the three different work regions of the drilling machine by tracking the single prism and transmits the acquired location information to the terminal, such that by using the transmitted location information of the three different work regions, the terminal converts a drilling machine coordinate system into a design space coordinate system and recognizes an orientation of the drilling machine, wherein the terminal recognizes and displays a perforable region or a perforable point at a current position of the drilling machine through the location information of the drilling machine.

2. The smart drilling system of claim 1, wherein the drilling machine comprises:
a position adjustment device configured to three-dimensionally move the drill for perforation.

3. The smart drilling system of claim 2, wherein a relative position of the prism with respect to the drill is fixed, and a three-dimensional displacement and an angle of the drill are the same with a three-dimensional displacement and an angle of the prism when the position adjustment device is driven.

4. The smart drilling system of claim 3, wherein the drilling machine comprises a moving device configured to support the drilling machine on a floor surface of the actual space and to move the position adjustment device parallel to the floor surface of the actual space.

5. The smart drilling system of claim 4, wherein the drilling machine comprises an ascending/descending device disposed between the moving device and the position adjustment device and configured to adjust a height of an initial position of the drill.

6. The smart drilling system of claim 2, wherein the position adjustment device is a robot comprising a plurality of arms, and the drill and the prism are disposed at an arm installed at an end of the robot.

7. The smart drilling system of claim 6, wherein the location information of the drilling machine comprises reference location information of the drilling machine and location information of the three different working regions, the three different working regions comprising three different robot work regions based on preset driving of the robot.

8. The smart drilling system of claim 7, wherein the terminal mutually distinguishably displays all perforation points, a current perforable point, a perforated point, and a point being perforated.

9. The smart drilling system of claim 1, wherein the total station tracks the prism in real time and acquires the location information of the drilling machine.

10. The smart drilling system of claim 9, wherein the drilling machine comprises a tilt sensor configured to sense slopes along three axes and transmits a value sensed by the tilt sensor to the terminal.

11. The smart drilling system of claim 10, wherein the terminal controls driving of the position adjustment device and driving of the drill; and
wherein the drilling machine transmits state information of driving of the position adjustment device and the drill to the terminal.

12. A smart drilling machine for performing perforation through control of driving of an external terminal, the smart drilling machine comprising:
a drill;
a position adjustment device configured to three-dimensionally move the drill for perforation;
a single prism rigidly fixed to and is spaced apart from the drill by a bracket, the prism being configured to allow an external total station fixedly positioned on a floor surface of a construction site to acquire location information of the smart drilling machine and the location information of the drill through tracking the prism;
a moving device configured to support the drilling machine on the floor surface and to move the position adjustment device parallel to the floor surface; and
an ascending/descending device disposed between the moving device and the position adjustment device and configured to adjust a height of an initial position of the drill,
wherein the position adjustment device moves the prism to positions of three different work regions of the drilling machine through preset driving in order to sequentially acquire location information of the three different work regions of the drilling machine through tracking the single prism and transmit the acquired location information to the terminal by the total station, such that by using the transmitted location information of the three different work regions, the terminal converts a drilling machine coordinate system into a design space coordinate system and recognizes an orientation of the drilling machine and a perforable region or a perforable point of the drilling machine.

13. The smart drilling machine of claim 12, wherein the smart drilling machine comprises a tilt sensor configured to sense slopes along three axes and transmits a value sensed by the tilt sensor to the terminal;
wherein the position adjustment device and the drill are driven through control of the terminal, and state information of driving of the position adjustment device and the drill is transmitted to the terminal; and
wherein the position adjustment device is a robot comprising a plurality of arms.

14. The smart drilling machine of claim 13, further comprising:
a sensor configured to detect contact with a ceiling surface when the drill moves upwards to prevent an error in an actual perforation depth due to a construction error,
wherein a value sensed by the sensor is transmitted to the terminal.

15. The smart drilling machine of claim 14, wherein the drill comes into contact with the ceiling surface and then performs perforation to a preset perforation depth based on a contact position with the ceiling surface.

16. A method of controlling a smart drilling system, the method comprising:
a setting operation of connecting a total station fixedly positioned on a floor surface of a construction site and a drilling machine via communication and displaying perforation location information in a design space, by an external terminal having a display;
a first measurement operation of acquiring location information of a reference point of an actual space and transmitting the acquired location information to the terminal, by the total station;
a first matching operation of displaying a location of the total station, by the terminal;

a second measurement operation of acquiring location information of the drilling machine and a drill by tracking a single prism rigidly fixed to and spaced apart from the drill by a bracket, and transmitting the acquired location information to the terminal, by the total station;

a second matching operation of displaying a location of the drilling machine, by the terminal;

a third measurement operation of moving the drilling machine to positions of three different work regions of the drilling machine, sequentially acquiring, by the total station, location information of the three different work regions of the drilling machine by tracking the single prism, and transmitting, by the total station, the acquired location information to the terminal to convert a drilling machine coordinate system into a design space coordinate system and to recognize an orientation of the drilling machine by using the transmitted location information of the three different work regions;

a perforation preparation operation of displaying a perforable region or a perforable point at a current position of the drilling machine, by the terminal; and a perforation operation of performing perforation through the drill of the drilling machine.

17. The method of claim 16, wherein, when all perforation tasks are terminated at the current position of the drilling machine, the total station tracks movement of the drilling machine in real time and transmits the acquired location information of the drilling machine to the terminal.

18. The method of claim 17, wherein, when a position of the drilling machine is moved, a moving route of the drilling machine is displayed on the terminal.

19. The method of claim 16, wherein the perforation operation comprises mutually distinguishably displaying all perforation points, a current perforable point, a perforated point, and a point being perforated, by the terminal.

* * * * *